(12) United States Patent
Kida

(10) Patent No.: US 7,829,439 B2
(45) Date of Patent: Nov. 9, 2010

(54) LASER BEAM PROCESSING METHOD FOR MAKING A SEMICONDUCTOR DEVICE

(75) Inventor: Tsuyoshi Kida, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 377 days.

(21) Appl. No.: 11/968,718

(22) Filed: Jan. 3, 2008

(65) Prior Publication Data

US 2008/0113494 A1 May 15, 2008

Related U.S. Application Data

(62) Division of application No. 11/217,436, filed on Sep. 2, 2005, now Pat. No. 7,545,024.

(30) Foreign Application Priority Data

Sep. 2, 2004 (JP) ............................. 2004-255131

(51) Int. Cl.
*H01L 21/46* (2006.01)
*H01L 21/301* (2006.01)

(52) U.S. Cl. .............................. 438/463; 257/E21.347; 257/E21.596; 438/462

(58) Field of Classification Search .......... 257/E21.347, 257/E21.596; 438/462, 463
See application file for complete search history.

(56) References Cited

U.S. PATENT DOCUMENTS 5,266,511 A * 11/1993 Takao ......................... 438/401
7,265,033 B2 * 9/2007 Shigematsu et al. ......... 438/463

FOREIGN PATENT DOCUMENTS

| JP | 01-304721 | 12/1989 |
| JP | 2002-176140 | 6/2002 |
| JP | 2002-329686 | 11/2002 |
| JP | 2003-320466 | 11/2003 |
| JP | 2004-221286 | 8/2004 |

OTHER PUBLICATIONS

Japanese Patent Office issued a Japanese Office Action dated Dec. 22, 2009, Application No. 2004-255131.

* cited by examiner

*Primary Examiner*—Asok K Sarkar
(74) *Attorney, Agent, or Firm*—Young & Thompson

(57) ABSTRACT

In a laser beam processing apparatus that processes a semiconductor wafer having a multi-layered wiring structure formed thereon, scribe lines defined thereon, and at least one alignment mark formed on any one of the scribe lines, a laser beam generator system generates a laser beam, and a movement system relatively moves the semiconductor wafer with respect to the laser beam such that the semiconductor wafer is irradiated with a laser beam along the scribe lines to partially remove the multi-layered wiring structure from the semiconductor wafer along the scribe lines. An irradiation control system controls the irradiation of the semiconductor wafer with the laser beam along the scribe lines such that the alignment mark is left on the scribe line.

3 Claims, 18 Drawing Sheets

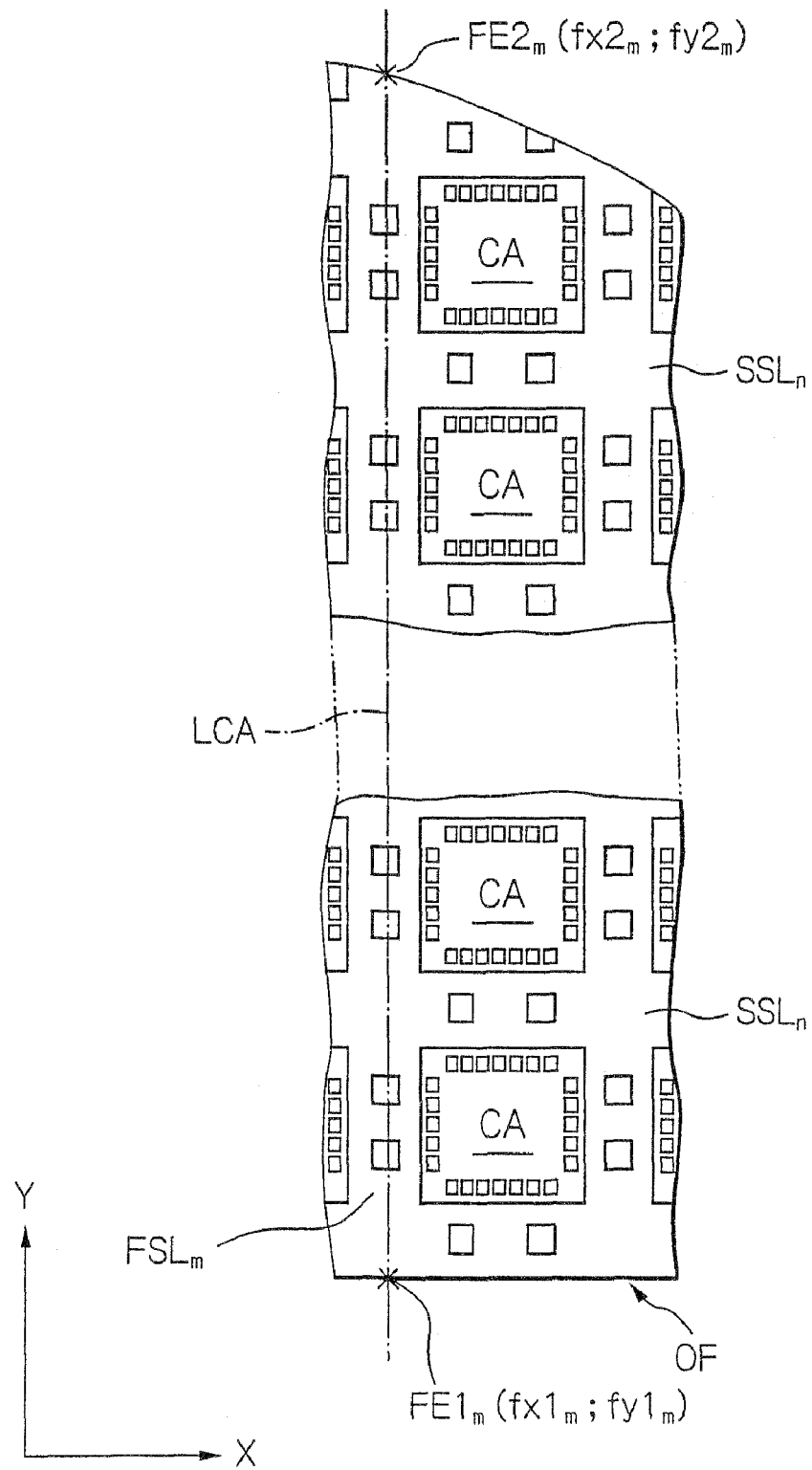

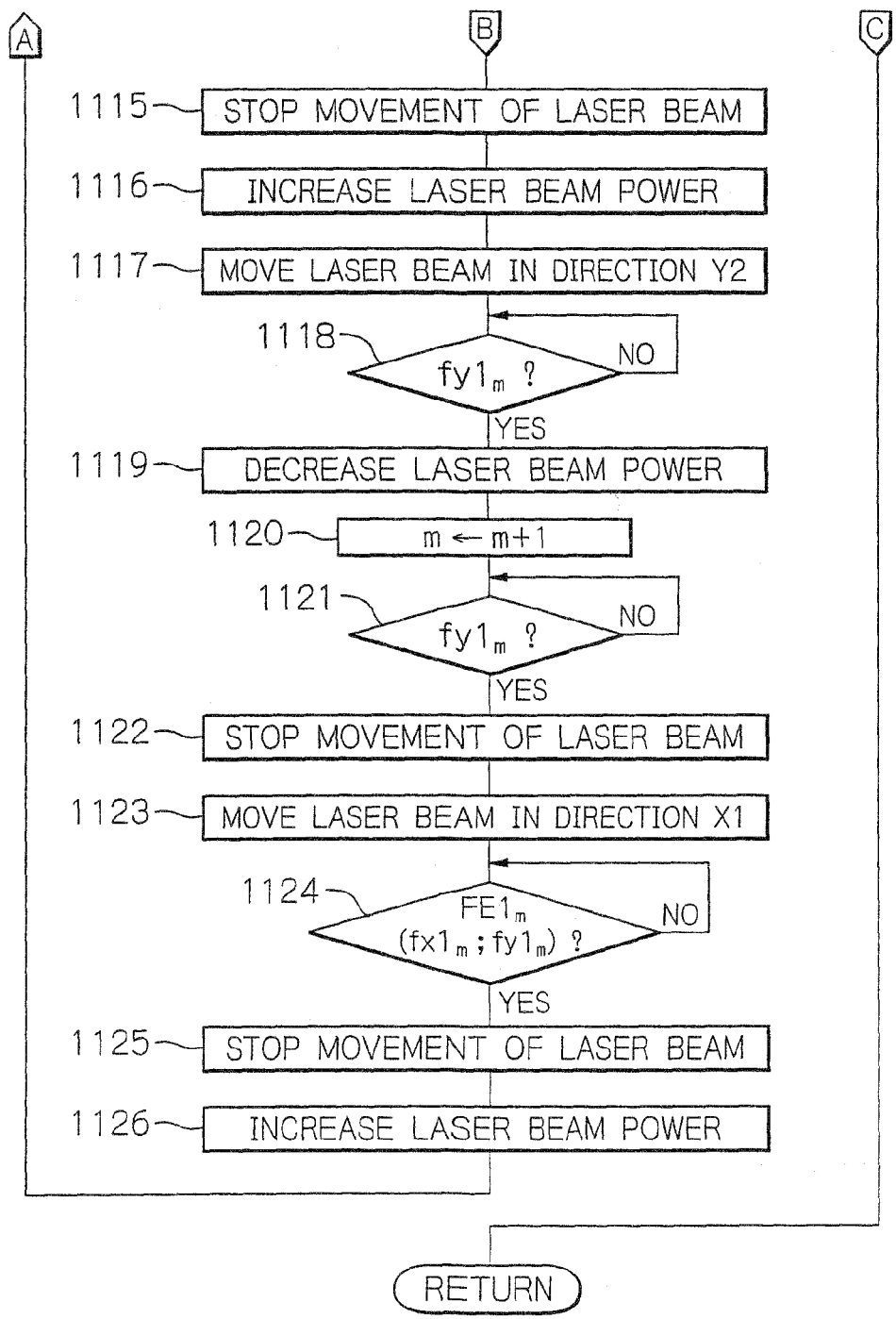

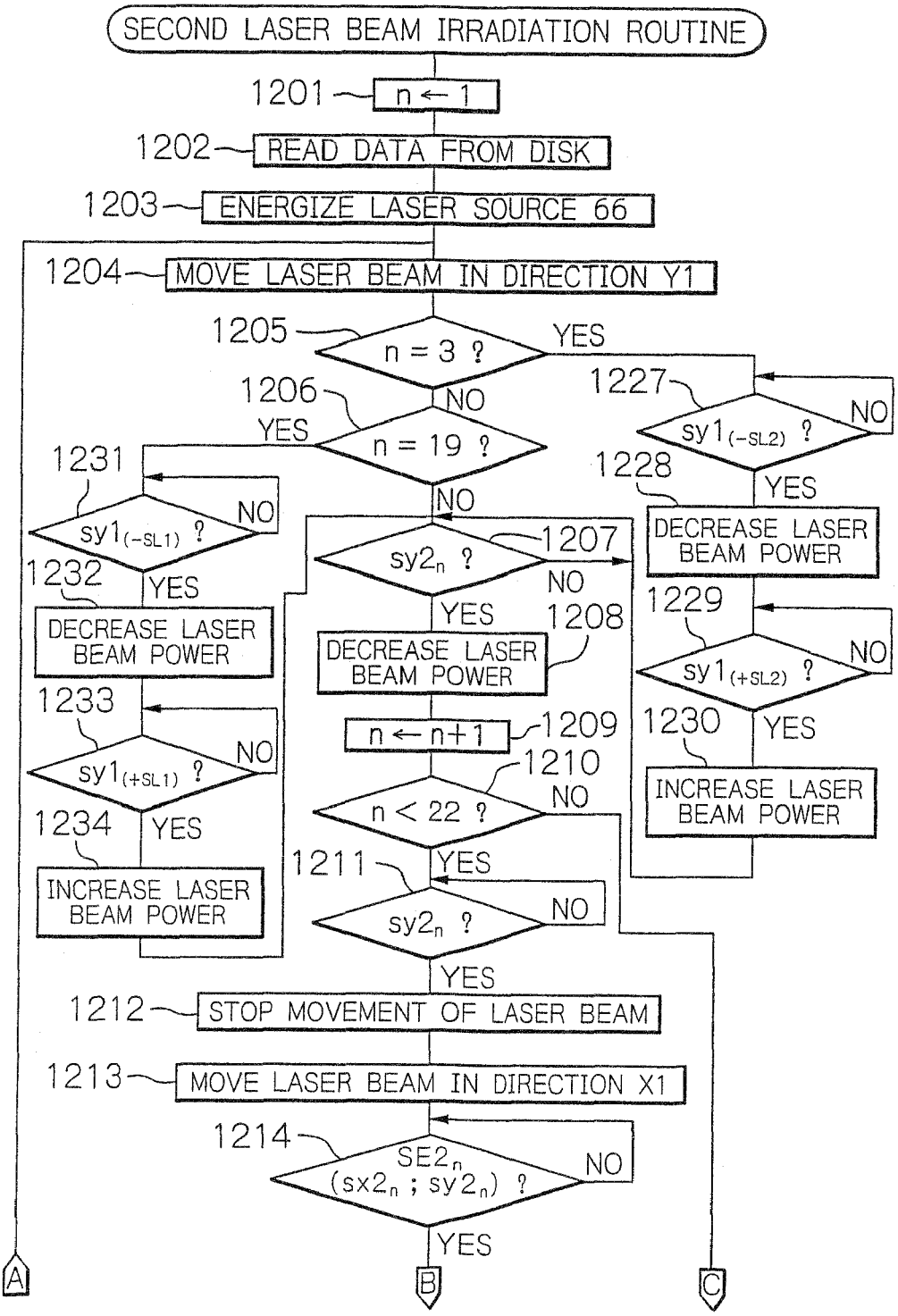

LASER BEAM PROCESSING METHOD FOR MAKING A SEMICONDUCTOR DEVICE

BACKGROUND OF THE INVENTION

1. Field of the Invention

The present invention relates to a laser beam processing apparatus that processes a semiconductor wafer with a laser beam in production of semiconductor devices, and a laser beam processing method executed in such a laser beam processing apparatus. Further, the present invention relates to a semiconductor wafer processed by the laser beam processing apparatus.

2. Description of the Related Art

In a representative process of producing a plurality of semiconductor devices, for example, a silicon wafer is prepared, and a surface of the silicon wafer is sectioned into a plurality of semiconductor chip areas which are defined by grid-like scribe lines formed in the silicon wafer. Note, each of the scribe lines has a width falling within a range between 40 μm and 70 μm.

The silicon wafer is processed by various well-known methods such that each of the semiconductor chip areas is produced as a semiconductor device, and a multi-layered wiring structure including a plurality of wiring arrangement sections defined therein is formed over the silicon wafer such that the respective wiring arrangement sections are allocated to the semiconductor devices, with the grid-like scribe lines being covered with multi-layered wiring structure. Thereafter, the silicon wafer is subjected to a dicing process in which the plurality of semiconductor devices (i.e. bare chips) are cut along the grid-like scribe lines so as to be individually separated from each other.

The dicing process is automatically carried out in a dicing apparatus. In particular, the dicing apparatus includes a table on which the silicon wafer is mounted, and a rotary cutting blade which is associated with the table. During the dicing process, the rotary cutting blade is rotationally driven, and the table carrying the silicon wafer is automatically moved with respect to the rotating cutting blade such that the silicon wafer is cut along the scribe lines. Before this automatic cutting operation can be properly carried out, the silicon wafer must be precisely positioned at an initial position with respect to the rotating cutting blade.

JP-A-H01-304721 discloses a silicon wafer which is provided with at least one alignment mark formed on any one of cross points defined by the grid-like scribe lines, and it is possible for the dicing apparatus to precisely position the silicon wafer at an initial position by detecting the alignment mark. The alignment mark may be formed of aluminum by using a photolithography process and an etching process. Note, in addition to the alignment mark, test electrode pads, test circuit patterns and so on may be formed on the grid-like scribe lines, as disclosed in, for example, JP-2002-176140.

As well know, the multi-layered wiring structure is composed of insulating interlayers and wiring metal pattern layers alternately laminated on each other, and each of the insulating interlayers is made of suitable dielectric material, such as silicon dioxide, low-k material or the like. These insulating interlayers are more fragile in comparison with the silicon wafer per se, and thus chips or cracks may easily occur in the multi-layered wiring structure along the grid-like scribe lines thereof during the dicing process. When the chips or cracks penetrate into one of the wiring arrangement sections allocated to the semiconductor devices, the semiconductor device concerned becomes defective. This problem has become more severe with the recent advance of miniaturization of semiconductor devices, because the width of the grid-like scribe lines has become narrower due to the advanced miniaturization.

It is proposed that the silicon wafer be processed by a laser beam processing apparatus before it is subjected to the dicing process, to prevent the penetration of the chips or cracks into the wiring arrangement sections allocated to the semiconductor devices, as disclosed in, for example, JP-2002-329686 and JP-2003-320466. In particular, in the laser beam processing apparatus, the multi-layered wiring structure is irradiated with a laser beam along the grid-like scribe lines so that only the multi-layered wiring structure is cut into the wiring arrangement sections. In other words, the multi-layered wiring structure is partially removed from the silicon wafer along grid-like scribe lines.

When the processed silicon wafer is transferred from the laser beam processing apparatus to a dicing apparatus, or when the processed silicon wafer is shipped to a factory in which the processed silicon wafer is diced by using a dicing apparatus, it is difficult to efficiently and automatically carry out a dicing process in the dicing apparatus, because the alignment mark is eliminated from the processed silicon wafer. In particular, as stated above, before an efficient and automatic dicing process can be properly carried out, the silicon wafer must be precisely positioned at an initial position with respect to the rotating cutting blade of the dicing apparatus. Nevertheless, it is impossible to utilize the alignment mark for the precise positioning of the processed silicon wafer in the initial position.

SUMMARY OF THE INVENTION

Therefore, the present invention is directed to a laser beam processing apparatus that irradiates a multi-layered wiring structure on a semiconductor wafer with a laser beam along grid-like scribe lines so as to partially remove the multi-layered wiring structure along the grid-like scribe lines in such a manner that at least one alignment mark is left on the multi-layered wiring structure at a location on the grid-like scribe lines.

The present invention is also directed to a laser beam processing method executed in such a laser beam processing apparatus.

The present invention is further directed to a semiconductor wafer processed by such a laser beam processing apparatus.

In accordance with a first aspect of the present invention, there is provided a laser beam processing apparatus that processes a semiconductor wafer having a multi-layered wiring structure formed thereon, scribe lines defined thereon, and at least one alignment mark formed on any one of the scribe lines, which comprises: a laser beam generator system that generates a laser beam; a movement system that relatively moves the semiconductor wafer with respect to the laser beam such that the semiconductor wafer is irradiated with a laser beam along the scribe lines to partially remove the multi-layered wiring structure from the semiconductor wafer along the scribe lines; and an irradiation control system that controls the irradiation of the semiconductor wafer with the laser beam along the scribe lines such that the alignment mark is left on the scribe line.

In this laser beam processing apparatus, the laser beam generator system may include a laser light source for producing the laser beam, and the irradiation control system includes a laser beam generator driver circuit that drives the laser light source, a power of the laser beam being decreased by controlling the laser beam generator driver circuit when the alignment mark is irradiated with the laser beam, whereby it is ensured that the alignment mark is left on the scribe line.

Optionally, the laser beam generator system may include an optical deflector, and a driver circuit that drives the optical deflector, the laser beam being deflected by controlling the driver circuit with the irradiation control system when an alignment mark area including the alignment mark is irradiated with the laser beam, whereby it is ensured that the alignment mark is left on the scribe line.

In accordance with a second aspect of the present invention, there is provided a laser beam processing method comprising the steps of: preparing a semiconductor wafer having a multi-layered wiring structure formed thereon, scribe lines defined thereon, and at least one alignment mark formed on any one of the scribe lines; generating a laser beam; relatively moving the semiconductor wafer with respect to the laser beam such that the semiconductor wafer is irradiated with a laser beam along the scribe lines to partially remove the multi-layered wiring structure from the semiconductor wafer along the scribe lines; and controlling the irradiation of the semiconductor wafer with the laser beam along the scribe lines such that the alignment mark is left on the scribe line.

In controlling the irradiation of the semiconductor wafer with the laser beam along the scribe lines such that the alignment mark is left on the scribe line, a power of the laser beam may be decreased when the alignment mark is irradiated with the laser beam, whereby it is ensured that the alignment mark is left on the scribe line.

Optionally, the laser beam may be deflected when the alignment mark is irradiated with the laser beam, whereby it is ensured that the alignment mark is left on the scribe line.

In accordance with a third aspect of the present invention, there is provided a semiconductor wafer comprising: a substrate body; a multi-layered wiring structure formed on the substrate; scribe lines defined on the multi-layered wiring structure; and at least one alignment mark formed on any one of the scribe lines, wherein the multi-layered wiring structure is partially removed from the semiconductor wafer along the scribe lines, but the alignment mark is left on the scribe line. A width of the scribe line may be within a range between 40 μm and 70 μm.

BRIEF DESCRIPTION OF THE DRAWINGS

The above objects and other objects will be more clearly understood from the description set forth below, with reference to the accompanying drawings, wherein:

FIG. 7 is a partial plan view of the silicon wafer for explaining definition of X-Y coordinates of the ends of each of scribe lines of the silicon wafer;

FIG. 11B is the remaining part of the flowchart of the first laser beam irradiation routine;

FIG. 12A is a part of a flowchart of a second laser beam irradiation routine which is executed as a subroutine in the laser beam processing routine of FIG. 10;

DESCRIPTION OF THE PREFERRED EMBODIMENTS

Figure 1:
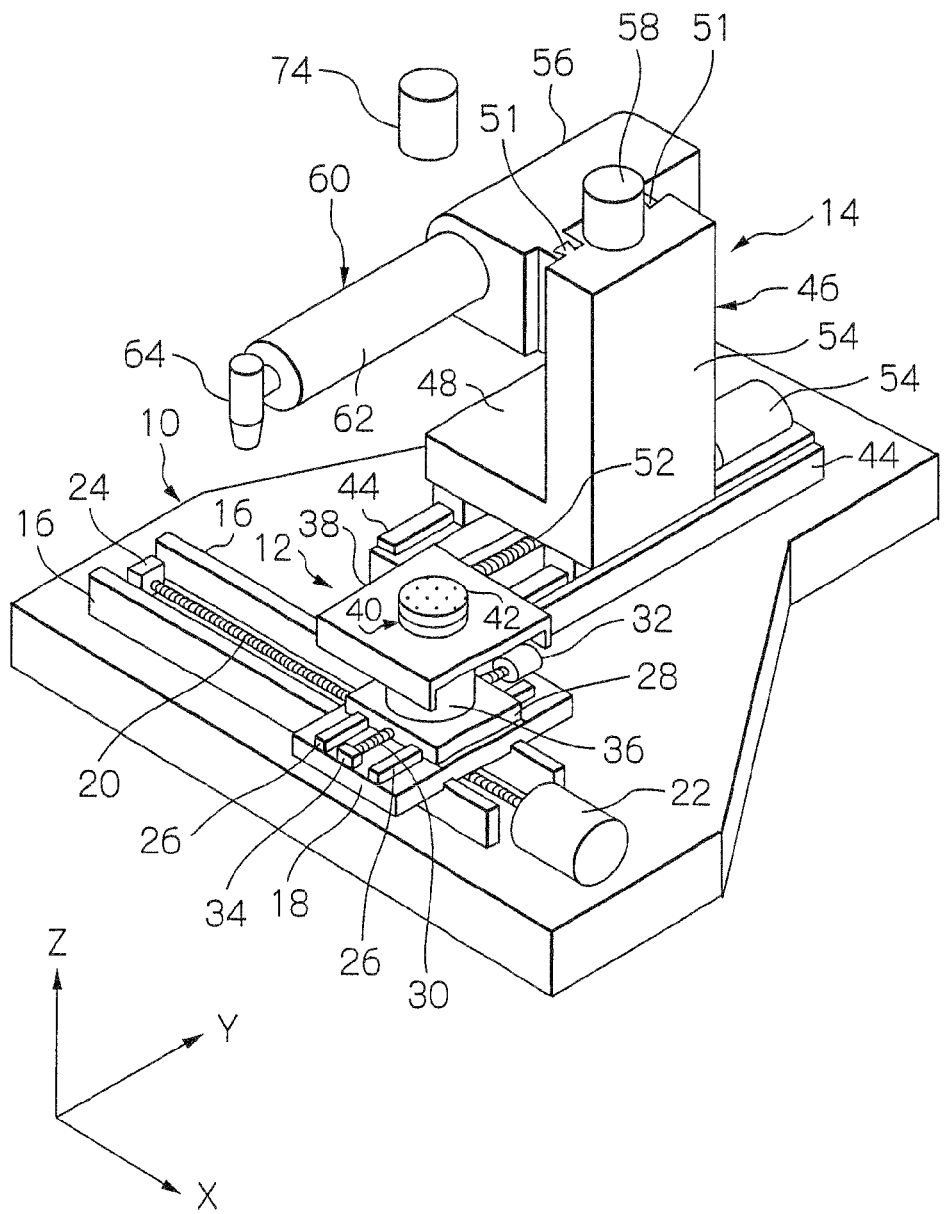
FIG. 1 is a schematic perspective view showing an embodiment of a laser beam processing apparatus according to the present invention.

With reference to FIG. 1, an embodiment of a laser beam processing apparatus according to the present invention will be now explained below.

The laser beam processing apparatus comprises a base frame 10, an X-Y movable table machine, generally indicated by reference 12, mounted on the base frame 10, a laser beam processing machine, generally indicated by reference 14, mounted on the base frame 10. Note, as shown in FIG. 1, an X-Y-Z coordinate system is defined with respect to the base frame 10.

The X-Y movable table machine 12 includes a first pair of parallel guide rails 16 securely laid on the base frame 10 so as to be in parallel with an X-axis of the X-Y-Z coordinate system, and a first movable frame 18 slidably mounted on the first parallel guide rails 16.

Although not visible in FIG. 1, the first movable frame 18 has a ball nut member provided on a bottom thereof, and the ball nut is engaged with an elongated screw 20 provided between the parallel guide rails 16, and the elongated screw 20 is formed as an output shaft of a first stepping motor 22 securely provided on the base table 10, with a free end of the elongated screw 20 being rotatably supported by a first block piece 24 securely provided on the base table 10. Thus, by driving the first stepping motor 22, it is possible to move the first movable frame 18 along the parallel guide rails 16, and therefore, the X-axis of the X-Y-Z coordinate system.

The X-Y movable table machine 12 also includes a second pair of parallel guide rails 26 securely laid on the first movable frame 18 so as to be in parallel with a Y-axis of the X-Y-Z coordinate system, and a second movable frame 28 slidably mounted on the parallel guide rails 26.

Although not visible in FIG. 1, the second movable frame 28 has a ball nut member provided on a bottom thereof, and the ball nut is engaged with an elongated screw 30 provided between the parallel guide rails 26, and the elongated screw 30 is formed as an output shaft of a second stepping motor 32 provided on the first movable frame 18, with a free end of the elongated screw 30 being rotatably supported by a second block piece 34 securely provided on the first movable frame 18. Thus, by driving the second stepping motor 32, it is possible to move the second movable frame 28 along the parallel guide rails 26, and therefore, the Y-axis of the X-Y-Z coordinate system.

The X-Y movable table machine 12 further includes a cylindrical member 36 securely provided on the second movable frame 28, a rectangular table 38 securely provided on a top of the cylindrical member 36, and a chuck plate assembly 40 rotatably provided on the rectangular table 38. The chuck plate assembly 40 can be rotated by driving a stepping motor 41 (which is shown as a block in FIG. 3) contained in the cylindrical member 36.

The chuck plate assembly 40 has a chuck plate 42 provided on a top thereof, and the chuck plate 42 has a plurality of holes formed therein. The chuck plate assembly 40 is constituted so as to allow it to be communicated with a vacuum source (not shown). When a silicon wafer is mounted on the chuck plate 42, the communication is established between the chuck plate assembly 40 and the vacuum source, and thus the silicon wafer is sucked to and immovably held on the chuck plate 42.

The laser beam processing machine 14 includes a pair of parallel guide rails 44 securely laid on the base frame 10 so as to be in parallel with the Y-axis of the X-Y-Z coordinate system, and a movable frame 46 slidably mounted on the parallel guide rails 44. The movable frame 46 has a rectangular base portion 48 slidably engaged with the parallel guide rails 44, and an upright portion 50 integrally extended upward from a side of the rectangular base portion 48. The upright portion 50 is formed with a pair of guide rails 51 which are vertically extended in parallel with a Z-axis of the X-Y-Z coordinate system.

Although not visible in FIG. 1, the movable frame 46 has a ball nut member provided on a bottom thereof, and the ball nut is engaged with an elongated screw 52 provided between the parallel guide rails 44, and the elongated screw 52 is formed as an output shaft of a stepping motor 54 provided on the base frame 10, with a free end of the elongated screw 52 being rotatably supported by a block piece (not visible) securely provided on the base frame 10. Thus, by driving the stepping motor 54, it is possible to move the movable frame 46 along the parallel guide rails 44, and therefore, the Y-axis of the X-Y-Z coordinate system.

The laser beam processing machine 14 also includes a block member 56 slidably engaged with the guide rails 51 of the upright portion of the movable frame 46. The block member 56 has a ball nut member (not visible) engaged with an elongated screw (not visible) provided between the parallel guide rails 51, and the elongated screw is formed as an output shaft of a stepping motor 58 provided on a top of the upright portion 50 of the movable frame 46. Thus, by driving the stepping motor 58, it is possible to move the block member 56 along the parallel guide rails 51, and therefore, the Z-axis of the X-Y-Z coordinate system.

The laser beam processing machine 14 further includes a laser beam generator 60 supported by the block member 56 in a cantilever manner, and the laser beam generator 60 has a cylindrical casing 62, and a laser beam irradiation head 64 attached to a free end of the cylindrical casing 62.

Figure 2:
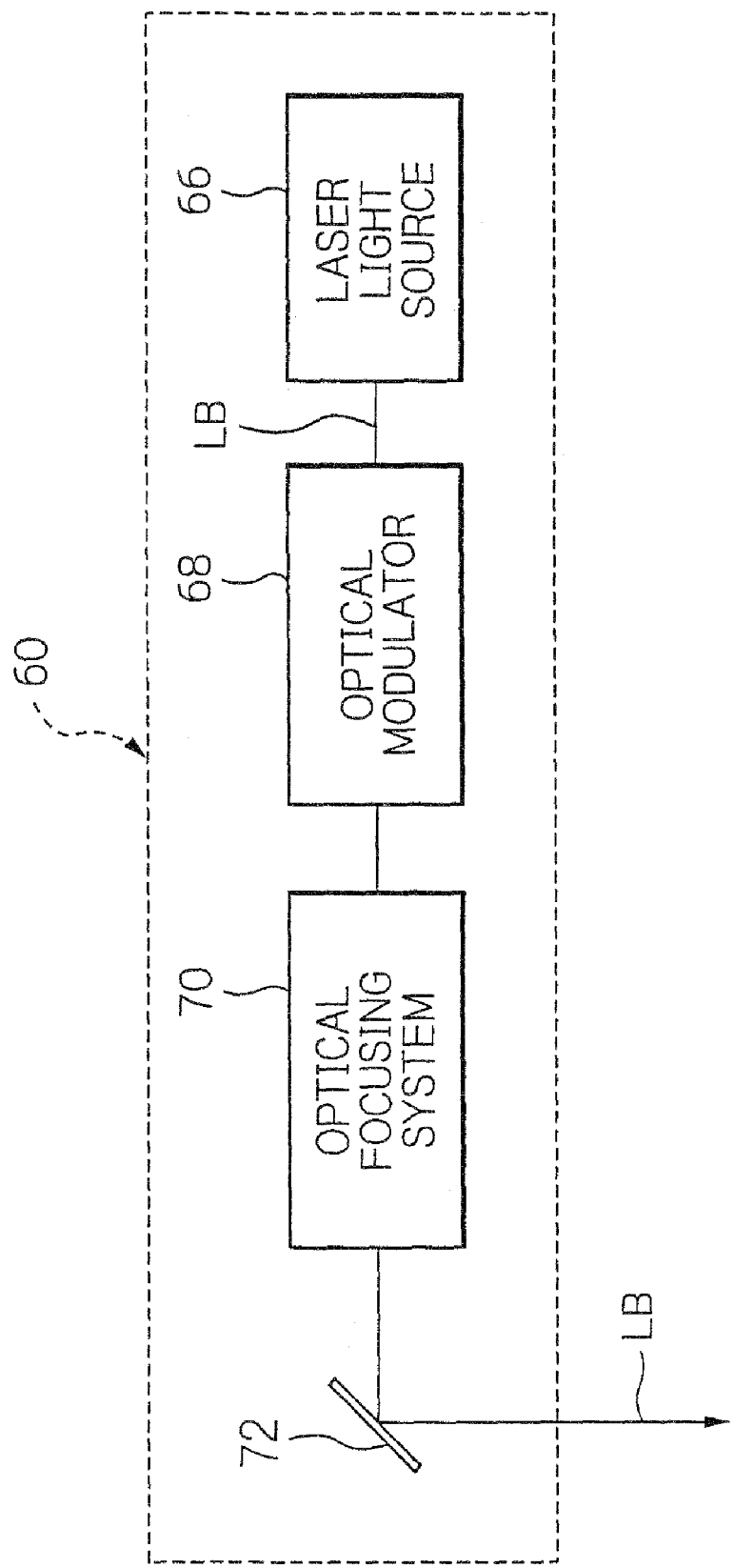
FIG. 2 is a block diagram of a laser beam generator used in the laser beam processing apparatus shown in FIG. 1.

As shown in FIG. 2, the laser beam generator 60 includes a laser light source 66, an optical modulator 68, and an optical focusing system 70 contained in the cylindrical casing 62, and a beam bender 72 contained in the laser beam irradiation head 64. In this embodiment, the laser light source 66 may be formed as a YAG laser light source. In FIG. 2, a laser beam LB is emitted from the laser light source 66, and then is suitably modulated by the optical modulator 68. The modulated laser beam is focused through the optical focusing system, and is reflected by the beam bender 72 so as to be directed to the silicon wafer held on the chuck plate 42.

Figure 3:
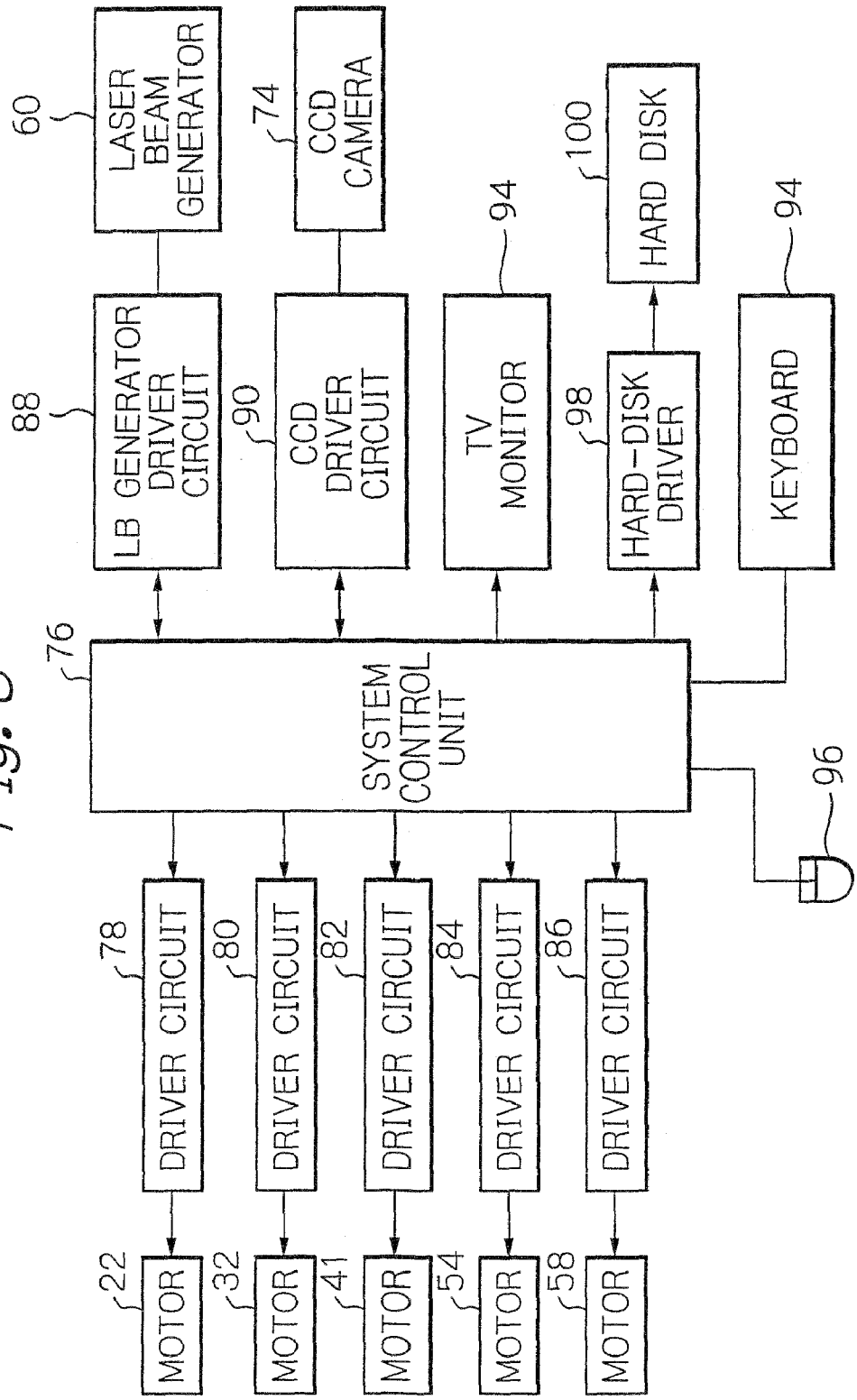
FIG. 3 is a block diagram of the laser beam processing apparatus.

Further, the laser beam processing apparatus is provided with a CCD (charge-coupled device) camera 74 (which is shown as a block in FIG. 3). Although not shown in FIG. 1, the CCD camera 74 is immovably supported by a suitable frame constructed on the base frame 10. Namely, the CCD camera 74 is immovable with respect to the X-Y-Z coordinate system.

With reference to FIG. 3, the above-mentioned laser beam processing apparatus is illustrated as a block diagram of the laser beam processing apparatus.

As shown in this drawing, the laser beam processing apparatus includes a system control unit 76 which contains a microcomputer having a central processing unit (CPU), a read-only memory (ROM) for storing programs and constants, a random-access memory (RAM) for storing temporary data, and an input/output (I/O) interface circuit.

The laser beam processing apparatus includes five driver circuits 78, 80, 82, 84 and 86 for driving the respective stepping motors 22, 32, 41, 54 and 58, and these stepping motors are controlled by the system control unit 76. Also, the laser beam processing apparatus includes a laser-beam generator driver circuit 88 for driving the laser beam generator 60, and a CCD driver circuit 90 for driving the to CCD camera 74, and these driver circuits 88 and 90 are controlled by the system control circuit 76.

As shown in FIG. 3, the laser beam processing apparatus is provided with a keyboard 92 for inputting various commands and data to the system control unit 76 though the I/O interface circuit thereof, a TV monitor 94 for displaying various command items, various information data and so on, and a mouse 96 for inputting a command to the system control unit 76 by clicking the mouse 94 on any one of the command items displayed on the TV monitor 94.

The laser beam processing apparatus further includes a hard disk driver 98 for driving a hard disk 100, on in which various data are stored. The system control unit 76 writes the various data in the hard disk 100 through the hard disk driver 98, and also reads the various data from the hard disk 100 through the hard disk drive 98.

Figure 4:
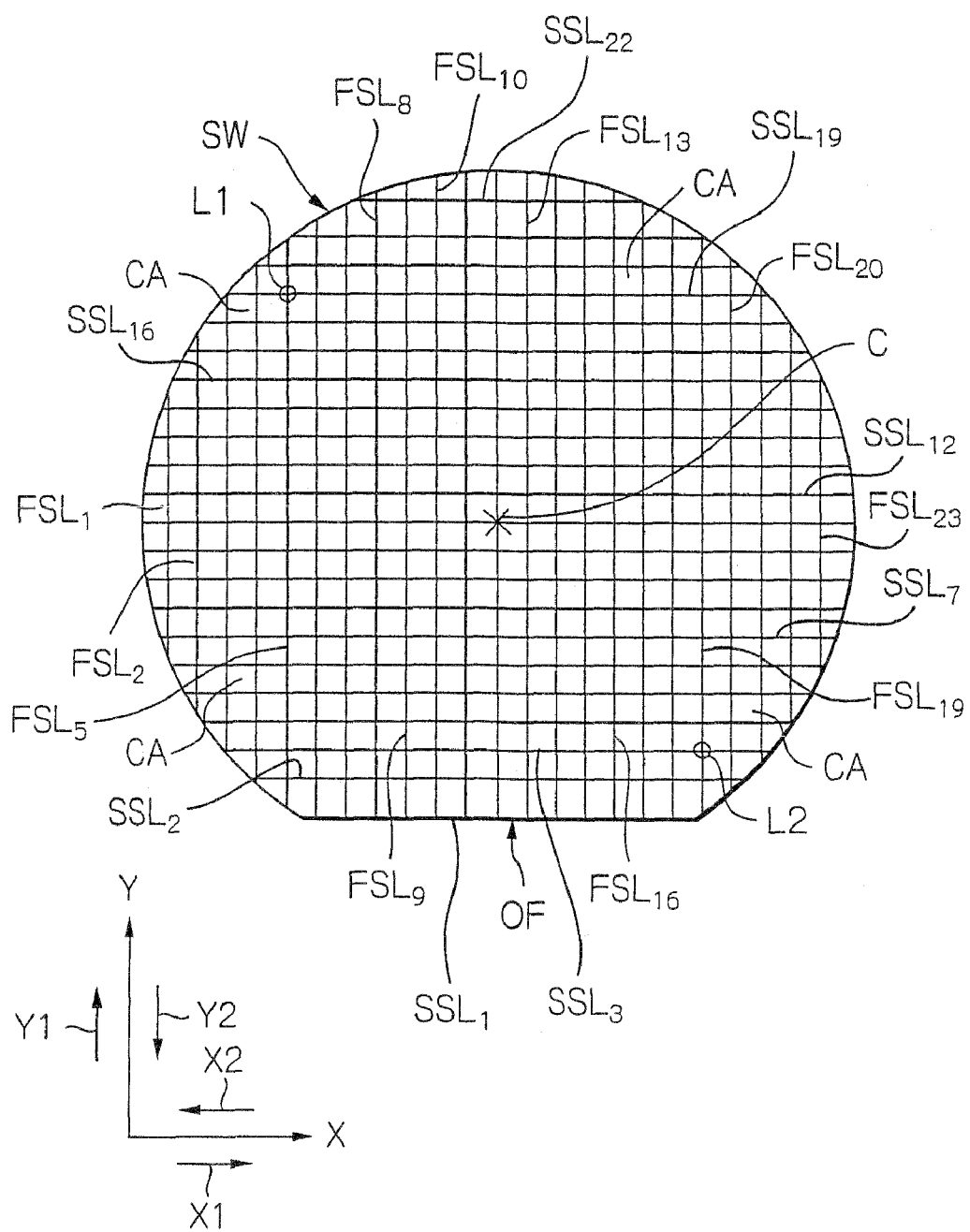
FIG. 4 is a plan view of a silicon wafer to be processed by the laser beam processing apparatus according to the present invention, with the silicon wafer being positioned at a first initial position.
Figure 5A:
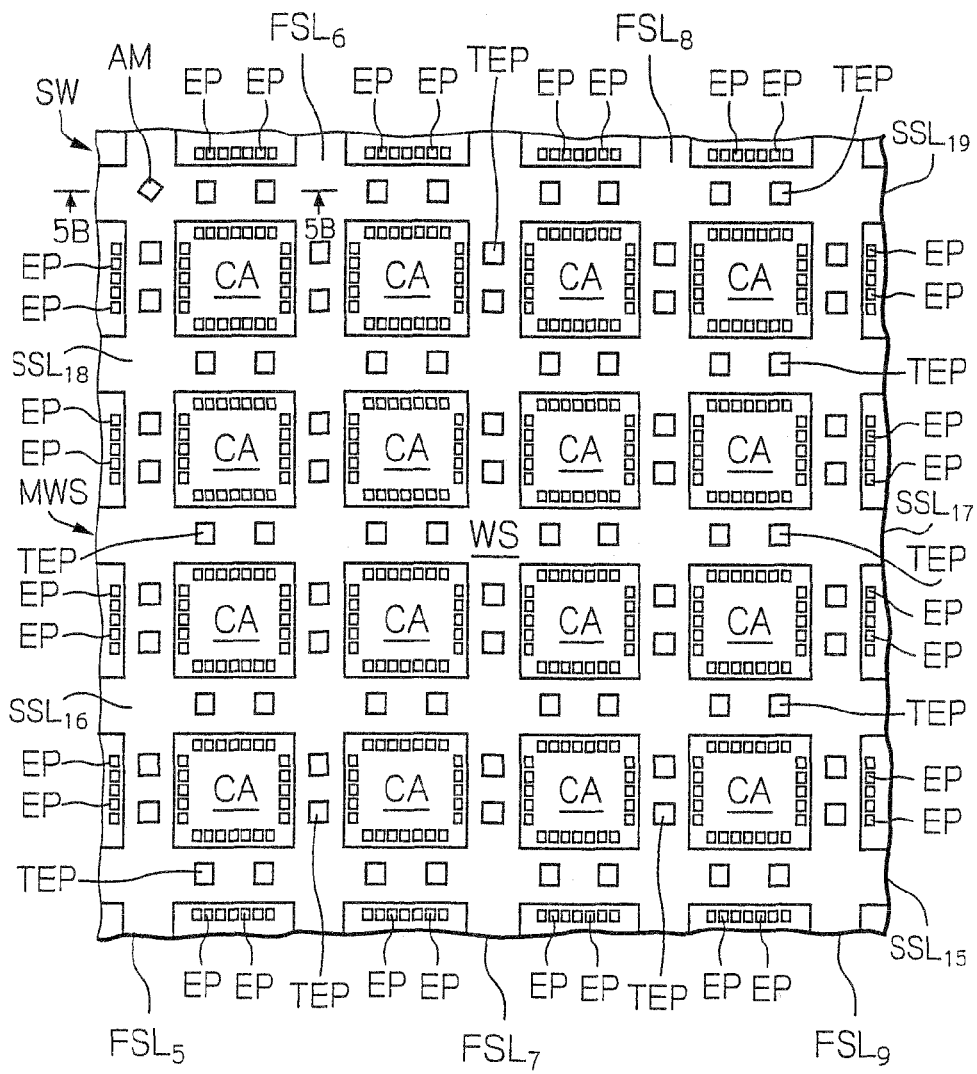
FIG. 5A is a partially-enlarged plan view of the silicon wafer shown in the FIG. 4.
Figure 5B:
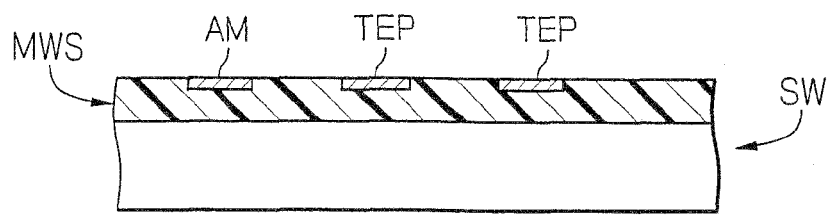
FIG. 5B is a cross-sectional view taken along the 5B-5B line of FIG. 5A.

FIG. 4 shows a silicon wafer SW which should be processed by the above-mentioned laser beam processing apparatus, FIG. 5A shows a part of the silicon wafer SW in an enlarged view, and FIG. 5B shows a cross section of the silicon wafer SW taken along the 5B-5B lines of FIG. 5A. As shown in FIG. 4, the silicon wafer SW is provided with an orientation flat, indicated by reference OF, which is used to orient and position the silicon wafer SW in various processings.

As shown in FIGS. 4 and 5A, a surface of the silicon wafer SW is sectioned into a plurality of semiconductor chip areas CA which are defined by a first group of scribe lines $FSL_m$ and a second group of scribe lines $SSL_n$, the scribe lines $FSL_m$ and scribe lines $SSL_n$ being intersected with each other so as to define a grid. Note, in this embodiment, the number of the scribe lines $FSL_m$ is twenty three (m=1, 2, . . . 22 and 23), and the number of the scribe lines $SSL_n$ is twenty two (n=1, 2, . . . 21 and 22). The first group of scribe lines $FSL_m$ is perpendicular to the orientation flat OF, and the second group of scribe lines $SSL_n$ is in parallel to the orientation flat OF. In this embodiment, the pitch of the scribe lines $FSL_m$ is substantially the same as that of the scribe lines $SSL_1$, and each of the scribe lines $FSL_m$ and $SSL_n$ has a width of 40 μm.

The silicon wafer SW is processed by various well-known methods such that each of the semiconductor chip areas CA is produced as a semiconductor device, and a multi-layered wiring structure MWS including a plurality of wiring arrangement sections defined therein is formed over the silicon wafer SW, as illustrated in FIG. 5B, with the respective wiring arrangement sections being allocated to the semiconductor devices or semiconductor chip areas CA.

As shown in FIGS. 5A and 5B, electrode pads EP are formed on a surface of the multi-layered wiring structure MWS at each of the semiconductor chip areas CA, and test electrode pads TEP are formed on the surface of the multi-layered wiring structure MMW along each of the scribe lines $FSL_m$ and $SSL_n$.

In this embodiment, the silicon wafer SW has two diamond-shaped alignment marks AM formed thereon, and only one of the alignment marks AM is illustrated in FIGS. 5A and 5B. The respective alignment marks AM are positioned at locations indicated by references L1 and L2 in FIG. 4. The location L1 is defined as a cross point of the scribe lines $FSL_5$ and $SSL_{19}$, and the location L2 is defined as a cross point of the scribe lines $FSL_{19}$ and $SSL_3$. Note, in this embodiment, the locations L1 and L2 are symmetrical with respect to a center of the silicon wafer SW indicated by reference C in FIG. 4.

Figure 6A:
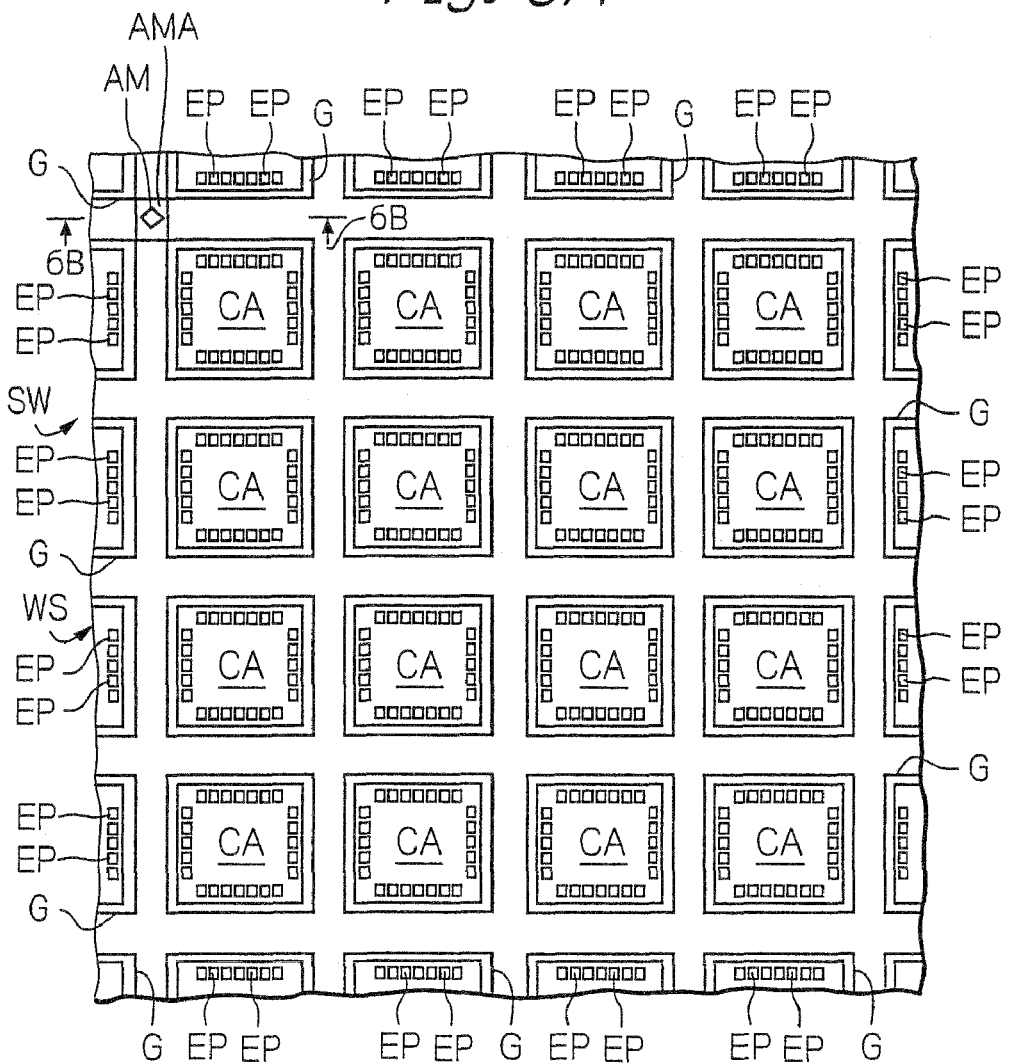
FIG. 6A is a partially-enlarged plan view, similar to FIG. 5, processed by the laser beam processing apparatus according to the present invention.
Figure 6B:
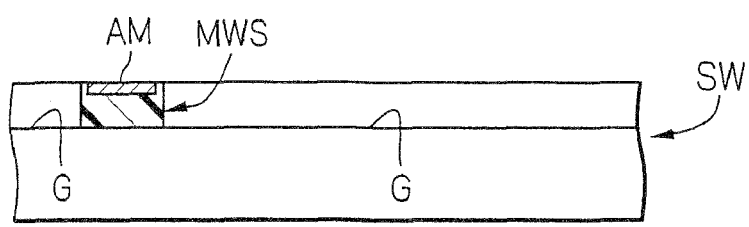
FIG. 6B is a cross-sectional view taken along the 6B-6B line of FIG. 6A.

According to the present invention, the silicon wafer SW is processed by the above-mentioned laser beam processing apparatus, so that only the multi-layered wiring structure MWS of the silicon wafer SW is cut into the wiring arrangement sections by irradiating the multi-layered wiring structure MWS with a laser beam along the scribe lines $FSL_m$ and $SSL_n$ in such a manner that alignment mark areas AMA including the respective alignment marks AM are left on the multi-layer wiring structure MWS, as representatively shown in FIGS. 6A and 6B. In other words, the multi-layered wiring structure MWS is partially removed from the silicon wafer SW along the scribe lines $FSL_m$ and $SSL_n$ in such a manner that grid-like grooves G are formed in the multi-layered wiring structure MWS except for the alignment mark areas AMA. Note, in this embodiment, the laser beam has a spot diameter of 20 μm.

In particular, in this embodiment, first, the silicon wafer SW is securely mounted on the chuck plate 42, and is then positioned by suitably driving the stepping motors 22 and 32 to a first initial position at which the orientation flat OF of the silicon wafer SW is in parallel to the X-axis of the X-Y-coordinate system (FIG. 1), as shown in FIG. 4. Thereafter, by suitably driving the stepping motors 22 and 32, the first group of scribe lines $FSL_m$ are irradiated in order with the laser beam emitted from the laser beam irradiation head 64, resulting in the partial removal of the multi-layered wiring structure MWS from the silicon wafer SW along the scribe lines $FSL_m$.

In order to carry out the partial removal of the multi-layered wiring structure MWS from the silicon wafer SW along the scribe lines $FSL_m$ in the laser beam processing apparatus shown in FIG. 1, X-Y coordinate data $FE1_m$ ($fx1_m$; $fy1_m$) and $FE2_m$ ($fx2_m$; $fy2_m$), which represent the ends of each of the scribe lines $FSL_m$ when the silicon wafer SW is positioned at the first initial position, are previously prepared and stored on the hard disk 100. As representatively shown in FIG. 7, each of the X-Y coordinates $FE1_m$ ($fx1_m$; $fy1_m$) and $FE2_m$ ($fx2_m$; $fy2_m$) is defined as a point sited on a longitudinal central axis LSA of a scribe line $FSL_m$ at the ends thereof.

Also, in order to leave the alignment mark areas AMA at the locations L1 and L2 (FIG. 4), X-Y coordinate data $FAL1_{(-FL1)}(fx1_5; fy1_{(-FL1)})$ and $FAL1_{(+FL1)}(fx1_5; fy1_{(+FL1)})$ and X-Y coordinate data $FAL2_{(-FL2)}(fx1_{19}; fy1_{(-FL2)})$ and $FAL2_{(+FL2)}(fx1_{19}; fy1_{(+FL2)})$, which are derived from respective X-Y coordinates of the alignment marks AM positioned in the locations L1 and L2, are previously prepared and stored on the hard disk 100.

Figure 8:
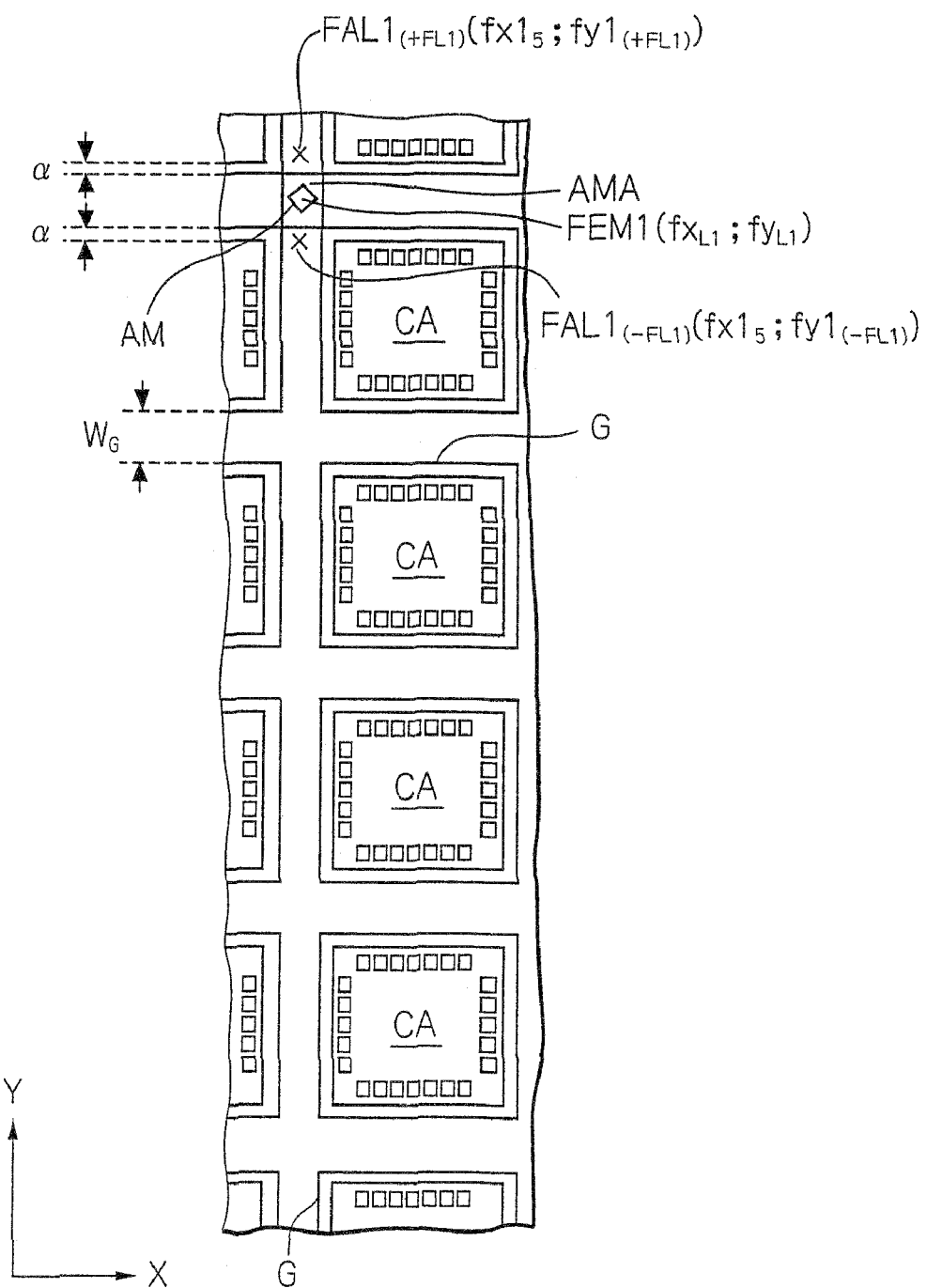
FIG. 8 is a partial plan view of the silicon wafer for explaining definition of X-Y coordinates, derived from an to X-Y coordinate of an alignment marks, for leaving the alignment mark on the silicon wafer.

For example, as shown in FIG. 8, when the X-Y coordinate of the alignment mark AM positioned in the location L1 is represented by $FAM1(fx_{L1}; fy_{L1})$, the Y-coordinates $fy1_{(-FL1)}$ and $fy1_{(+FL1)}$ of the X-Y coordinate data $FAL1_{(-FL1)}$ and $FAL1_{(+FL1)}$ are defined as follows:

$$fy1_{(-FL1)} = fy_{L1} - \tfrac{1}{2}W_G - \alpha$$

$$fy1_{(+FL1)} = fy_{L1} + \tfrac{1}{2}W_G + \alpha$$

Herein: α is a distance corresponding to a half of the spot diameter (20 μm) of the laser beam, and $W_G$ is a width of the grid-like grooves G.

Similarly, when the X-Y coordinate of the alignment mark AM positioned in the location L2 is represented by $FAM2(fX_{L2}; fy_{L2})$, the Y-coordinates $fy1_{(-FL2)}$ and $fy1_{(+FL2)}$ of the X-Y coordinate data $FAL2_{(-FL2)}$ and $FAL2_{(+FL2)}$ are defined as follows:

$$fy1_{(-FL2)} = fy_{L2} - \tfrac{1}{2}W_G - \alpha$$

$$fy1_{(+FL2)} = fy_{L2} + \tfrac{1}{2}W_G + \alpha$$

Figure 9:
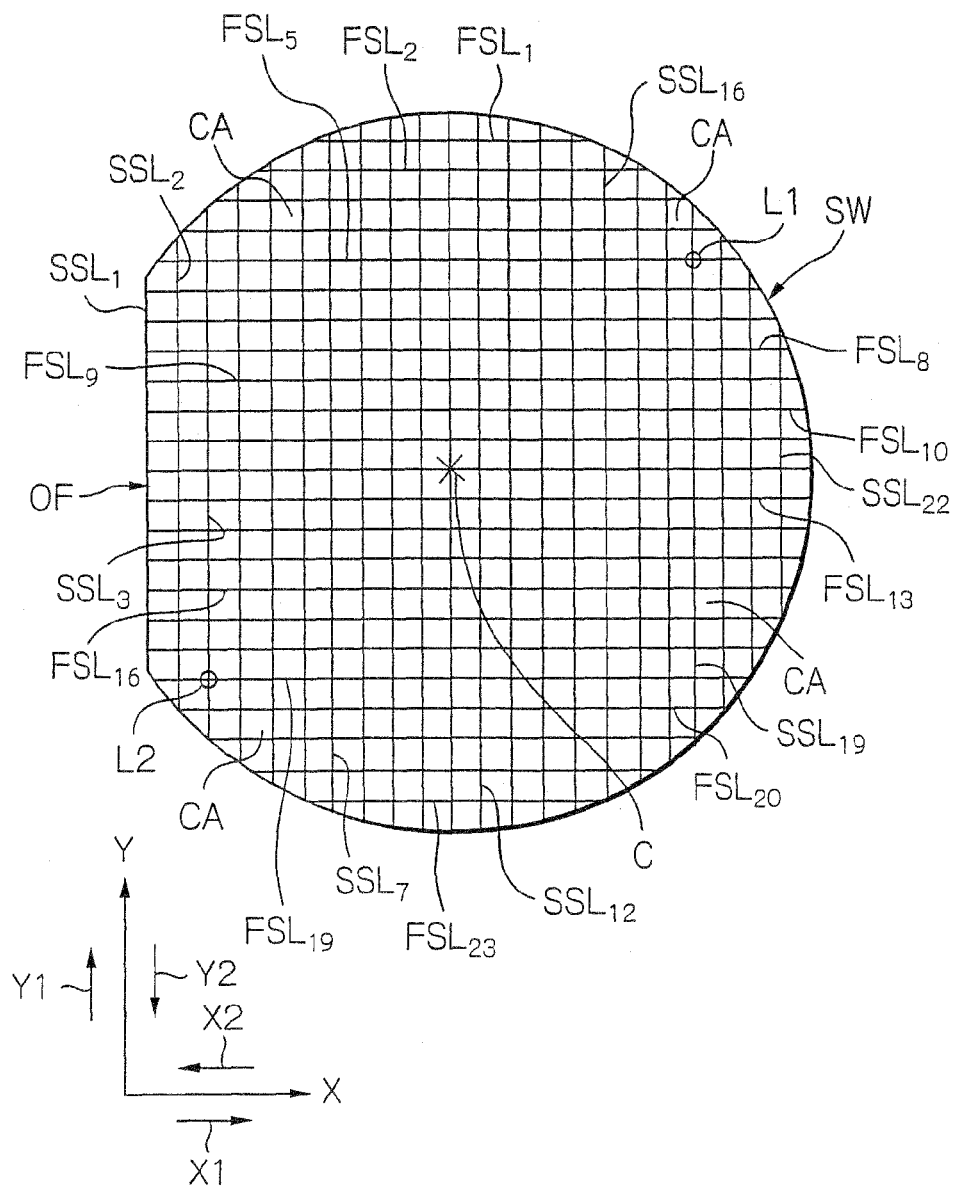
FIG. 9 is a plan view of the silicon wafer to be processed by the laser beam processing apparatus according to the present invention, with the silicon wafer being positioned at a second initial position.

After the partial removal of the multi-layered wiring structure MWS from the silicon wafer SW along the scribe lines $FSL_m$, the stepping motor 41 contained in the cylindrical member 36 is driven so that the silicon wafer SW is rotated clockwise by an angle of 90 degrees, as shown in FIG. 9. Then, the silicon wafer SW is positioned by suitably driving the stepping motors 22 and 32 to a second initial position at which the orientation flat OF of the silicon wafer SW is in parallel to the Y-axis of the X-Y-coordinate system (FIG. 1). Thereafter, by suitably driving the stepping motors 22 and 32, the second group of scribe lines $SSL_n$ are irradiated in order with the laser beam emitted from the laser beam irradiation head 64, resulting in the partial removal of the multi-layered wiring structure MWS from the silicon wafer SW along the scribe lines $SSL_n$.

In order to carry out the partial removal of the multi-layered wiring structure MWS from the silicon wafer SW along the scribe lines $SSL_n$, in the laser beam processing apparatus shown in FIG. 1, X-Y coordinate data $SE1_n(sx1_n; sy1_n)$ and $SE2_n(sx2_n; sy2_n)$, which represent the ends of each of the scribe lines $SSL_n$ when the silicon wafer SW is positioned at the second initial position, are previously prepared and stored on the hard disk 100.

Also, in order to leave the alignment mark areas AMA at the locations L1 and L2 (FIG. 9), X-Y coordinate data $SAL1_{(-SL1)}(sx1_5; sy1_{(-SL1)})$ and $SAL1_{(+SL1)}(sx1_5; sy1_{(+SL1)})$ and X-Y coordinate data $SAL2_{(-SL2)}(sx1_{19}; sy1_{(-SL2)})$ and $SAL2_{(+SL2)}(sx1_{19}; sy1_{(+sL2)})$, which are derived from respective X-Y coordinates of the alignment marks AM positioned in the locations L1 and L2, are previously prepared and stored on the hard disk 100.

Similar to the aforesaid X-Y coordinate data $FAL1_{(-FL1)}$ ($fx1_5$; $fy1_{(-FL1)}$) and $FAL1_{(+FL1)}$($fx1_5$; $fy1_{(+FL1)}$) and X-Y coordinate data $FAL2_{(-FL2)}$($fx1_9$; $fy1_{(-FL2)}$) and $FAL2_{(+FL2)}$ ($fx1_{19}$; $fy1_{(+FL2)}$), when the respective X-Y coordinates of the alignment marks AM positioned in the locations L1 and L2 is represented by $SAM1(sx_{L1}; sy_{L1})$ and $SAM2(sx_{L2}; sy_{L2})$, the Y-coordinates $sy1_{(-SL1)}$ and $sy1_{(+SL1)}$ of the X-Y coordinate data $SAL1_{(-SL1)}$ and $SAL1_{(+SL1)}$ and the Y-coordinates $sy2_{(-SL2)}$ and $sy2_{(+SL2)}$ of the X-Y coordinate data $SAL2_{(-SL2)}$ are defined as follows:

$$sy1_{(-SL1)} = sy_{L1} - \tfrac{1}{2} W_G - \alpha$$

$$sy1_{(+SL1)} = sy_{L1} + \tfrac{1}{2} W_G - \alpha$$

$$sy1_{(-SL2)} = sy_{L1} - \tfrac{1}{2} W_G - \alpha$$

$$sy1_{(+SL2)} = sy_{L1} + \tfrac{1}{2} W_G + \alpha$$

According to the present invention, when the processed silicon wafer SW is diced by using a dicing apparatus, it is possible to efficiently and automatically carry out a dicing process in the dicing apparatus, because the processed silicon wafer SW can be precisely positioned at an initial position with respect to the rotating cutting blade of the dicing apparatus by using the alignment marks AM left on the processed silicon wafer SW.

Figure 10:
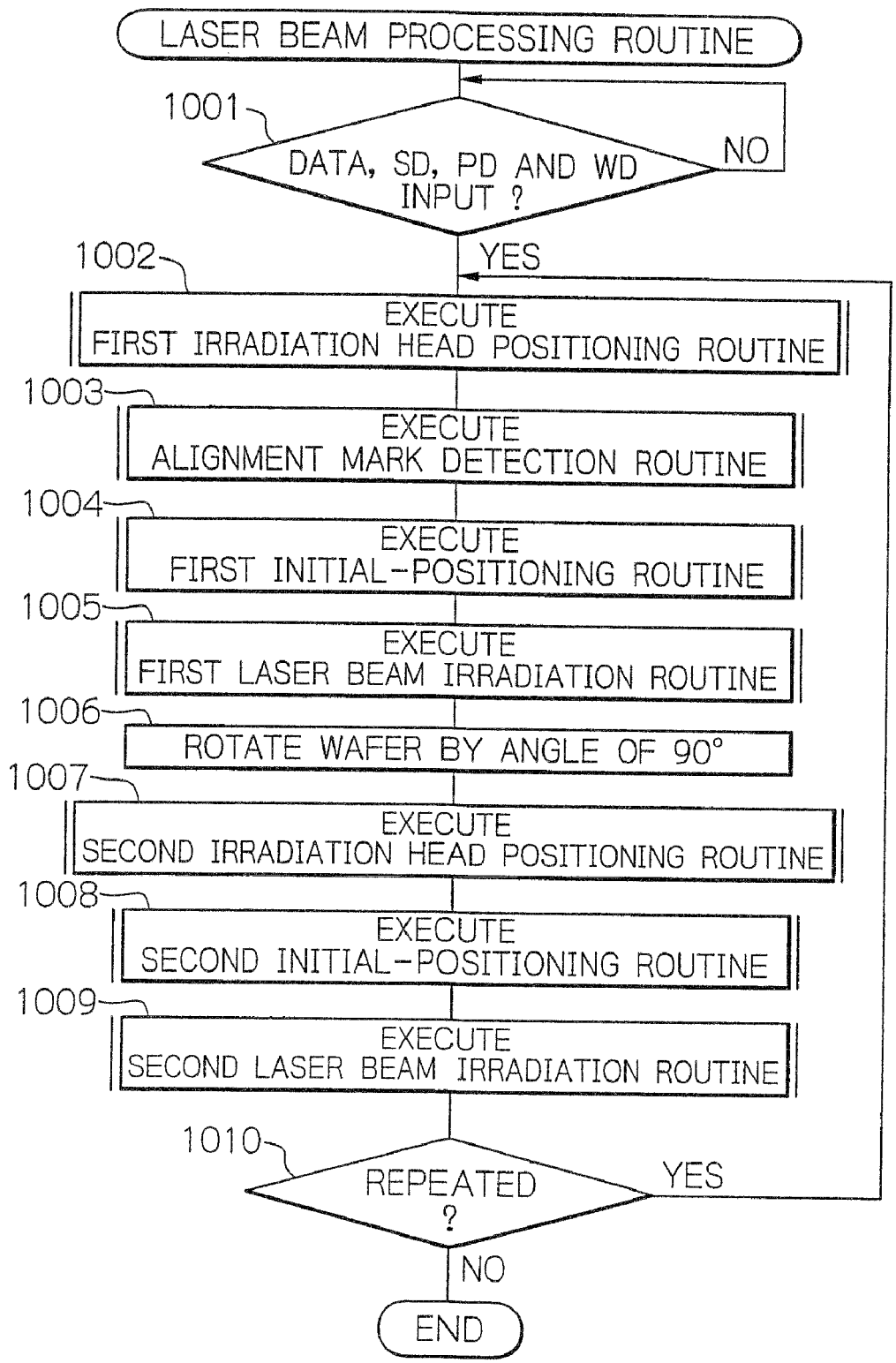
FIG. 10 is a flowchart of a laser beam processing routine executed in a system control unit shown in FIG. 3.

FIG. 10 shows a flowchart of a laser beam processing routine which is executed in the system control unit 76 shown in FIG. 3. Note, for example, an execution of the laser beam processing routine is started by clicking the mouse 96 on a routine-starting icon on the screen of the TV monitor 94, and an initial scene is displayed on the screen of the TV monitor 94. Also note, prior to the execution of the laser beam processing routine, the silicon wafer SW, as shown in FIGS. 4, 5A and 5B, is securely sucked and held on the chuck plate 42.

At step 1001, it is monitored whether various data are input to the system control unit 76 through a manipulation of the keyboard 94. Alternatively, these data may be input to the system control unit 76 by clicking the mouse 96 on data items displayed on the screen of the TV monitor 94.

Among the various data, there are size data SD of the silicon wafer SW to be processed, pitch data PD of the scribe lines $FSL_m$ and $SSL_n$, and width data WD of the grid-like scribe lines $FSL_m$ and $SSL_n$. Also, among the various data, there are scribe line data $FSL_5$ and $SSL_{19}$ and scribe line data $FSL_{19}$ and $SSL_3$ which are associated with the respective alignment marks AM.

When the inputting of the various data is confirmed, the control proceeds to step 1002, in which a first irradiation head positioning routine is executed based on the size data SD, pitch data PD and width data WD. Namely, the stepping motor 54 is driven by the driver circuit 84 such that the laser beam irradiation head 64 is positioned at a first laser beam irradiation starting position which is previously determined with respect to the silicon wafer SW featuring the size data SD, pitch data PD and width data WD.

After the execution of the first irradiation head positioning routine, the control proceeds to step 1003, in which an alignment mark detection routine is executed. Namely, image data of the silicon wafer SW are fetched from the CCD camera 74 through the CCD driver circuit 90, and are processed in the control system unit 76 so as to detect image data of the alignment marks AM therefrom. Then, X-Y coordinates of the alignment marks AM are determined with respect to the X-Y-Z coordinate system (FIG. 1) based on the detected image data of the alignment marks AM.

After the execution of the alignment mark detection routine, the control proceeds to step 1004, in which a first initial-positioning routine for positioning the silicon wafer SW at the aforesaid first initial position based on the X-Y coordinates of the detected alignment marks AM is executed. In particular, the respective stepping motors 22 and 32 are driven by the driver circuits 78 and 80 under control of the system control unit 76, based on the X-Y coordinates of the detected alignment marks AM, resulting in the positioning of the silicon wafer SW at the first initial position.

Note, when the silicon wafer SW is positioned at the first initial position, the laser beam irradiation head 64 is placed just above the X-Y coordinates $FE1_1(fx1_1; fy1_1)$. Thus, when a laser beam is emitted from the laser beam irradiation head 64, a location on the silicon wafer SW, represented by the X-Y coordinates $FE1_1(fx1_1; fy1_1)$, is irradiated with the emitted laser beam.

After the execution of the first initial-positioning routine, the control proceeds to step 1005, in which a first laser beam irradiation routine is executed. In the execution of the first laser beam irradiation routine, the multi-layered wiring structure MWS is partially removed from the silicon wafer SW along the scribe lines $FSL_m$ in such a manner that the grid-like grooves G are formed in the multi-layered wiring structure MWS along the scribe lines $FSL_m$ except for the alignment mark areas AMA. Note, the first laser beam irradiation routine is explained in detail hereinafter, with reference to FIGS. 11A and 11B.

After the execution of the first laser beam irradiation routine, the control proceeds to step 1006, in which the stepping motor 41 contained in the cylindrical member 36 is driven so that the silicon wafer SW is rotated by an angle of 90 degrees (FIG. 9).

Then, at step 1007, a second irradiation head positioning routine is executed based on the size data SD, pitch data PD and width data WD. Namely, the stepping motor 54 is driven by the driver circuit 84 such that the laser beam irradiation head 64 is positioned at a second laser beam irradiation starting position which is previously determined with respect to the 90-degree rotated silicon wafer SW featuring the size data SD, pitch data PD and width data WD.

After the execution of the second irradiation head positioning routine, the control proceeds to step 1008, in which a second initial-positioning routine for positioning the 90-degree rotated silicon wafer SW at the aforesaid second initial position is executed. In particular, the respective stepping motors 22 and 32 are driven by the driver circuits 78 and 80 under control of the system control unit 76, resulting in the positioning of the silicon wafer SW at the second initial position.

Note, when the silicon wafer SW is positioned at the second initial position, the laser beam irradiation head 64 is placed just above the X-Y coordinates $SE1_1(sx1_1; sy1_1)$. Thus, when a laser beam is emitted from the laser beam irradiation head 64, a location on the silicon wafer SW, represented by the X-Y coordinates $SE1_1(sx1_1; sy1_1)$, is irradiated with the emitted laser beam.

After the execution of the second initial-positioning routine, the control proceeds to step 1009, in which a second laser beam irradiation routine is executed. In the execution of the second laser beam irradiation routine, the multi-layered wiring structure MWS is partially removed from the silicon wafer SW along the scribe lines $SSL_m$ in such a manner that the grid-like grooves G are formed in the multi-layered wiring structure MWS along the scribe lines $SSL_m$ except for the alignment mark areas AMA. Note, the second laser beam irradiation routine is explained in detail hereinafter, with reference to FIGS. 12A and 12B.

After the execution of the second laser beam irradiation routine, the control proceeds to step 1010, in which it is determined whether the laser beam processing routine should be repeated, i.e. whether a silicon wafer SW remains to be processed. When the existence of a remaining silicon wafer SW is confirmed, the control returns to step 1002. When there is no silicon wafer to be tested, the routine ends.

Figure 11A:
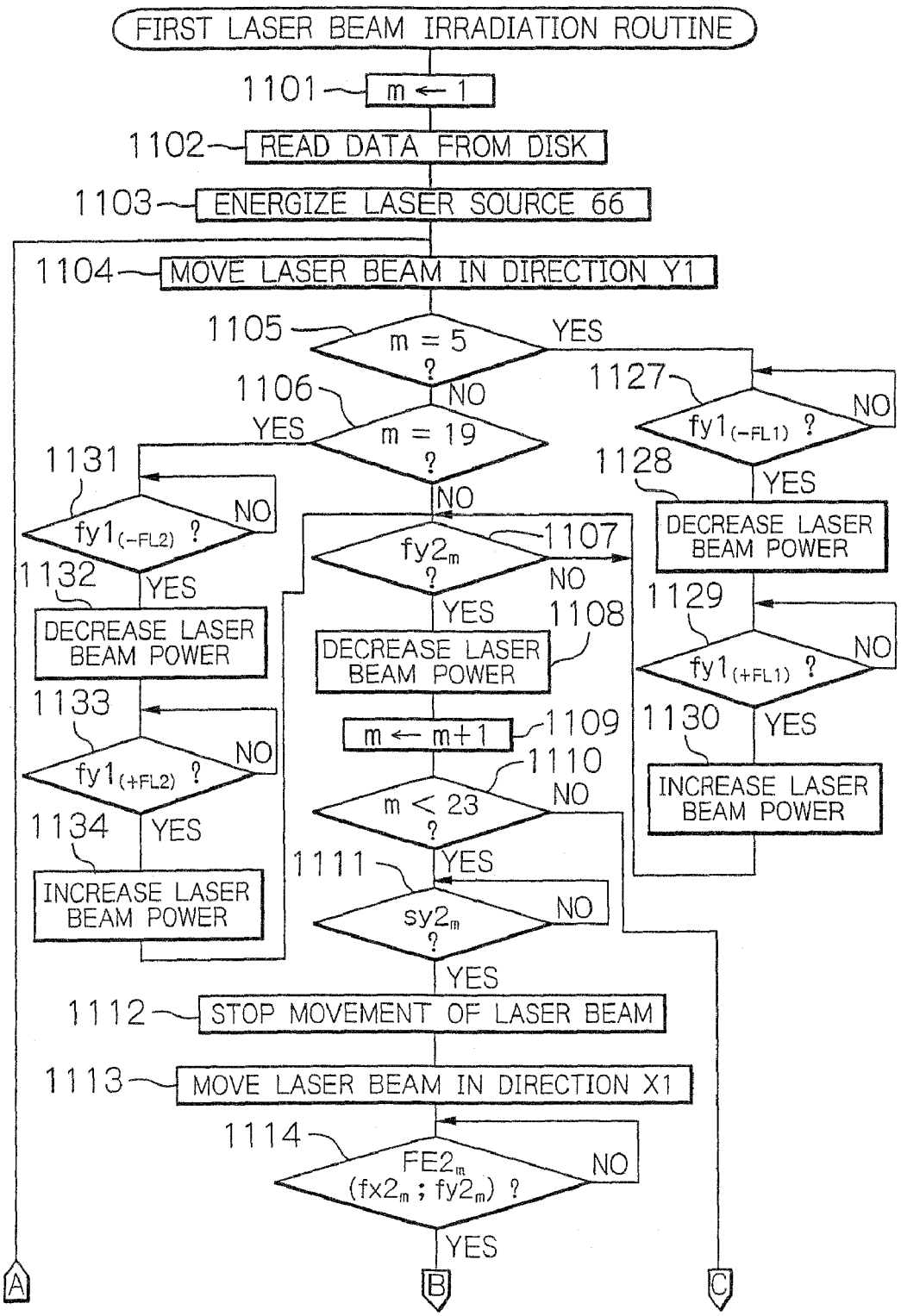
FIG. 11A is a part of a flowchart of a first laser beam irradiation routine which is executed as a subroutine in the laser beam processing routine of FIG. 10.

FIGS. 11A and 11B show a flowchart of the first laser beam irradiation routine which is executed as a subroutine in step 1005 of FIG. 10. Note, in reality, although the silicon wafer SW is moved with respect to the laser beam irradiation head 64 to irradiate the scribe lines $FSL_m$ with the laser beam, it is presumed that the laser beam irradiation head 64, and therefore, the laser beam, is moved with respect to the silicon wafer SW for the sake of explanatory convenience.

At step 1101, a counter m is initialized to be "1" Then, at step 1102, the X-Y coordinate data $FE1_m(fx1_m; fy1_m)$ and $FE2_m(fx2_m; fy2_m)$, the coordinate data $FAL1_{(-FL1)}(fx1_5; fy1_{(-FL1)})$ and $FAL1_{(+FL1)}(fx1_5; fy1_{(+FL1)})$ and the coordinate data $FAL2_{(-FL2)}(fx1_{19}; fy1_{(-FL2)})$ and $FAL2_{(+FL2)}(fx1_{19}; fy1_{(+FL2)})$ are read from the hard disk 100, and are then stored in the random-access memory (RAM) contained in the system control unit 76.

At step 1103, the laser light source 66 of the laser beam generator 60 is energized by the laser beam generator driver circuit 88 under control of the system control unit 76, so that the laser beam is emitted from the laser beam irradiation head 64, whereby the location on the silicon wafer SW, represented by the X-Y coordinates $FE1_1(fx1_1; fy1_1)$, is irradiated with the emitted laser beam. Of course, the laser beam has a sufficient power to remove the materials of the multi-layered wiring structure MWS.

At step 1104, the laser beam irradiation head 66, and therefore, the laser beam, is moved with respect to the silicon wafer SW along the Y-axis of the X-Y-Z coordinate system in a direction indicated by reference Y1 in FIG. 4, i.e., in reality, the stepping motor 32 is driven so that the silicon wafer SW is moved along the Y-axis of the X-Y-Z coordinate system in a direction indicated by reference Y2 in FIG. 4.

At step 1105, it is determined whether a count number of the counter m has reached "5". When the count number of the counter m has not reached "5" the control proceeds from step 1105 to step 1106, in which it is determined whether the count number of the counter m has reached "19". When the count number of the counter m has not reached "19", the control proceeds from step 1106 to step 1107, in which it is monitored whether the laser beam has arrived at the Y-coordinate $fy2_m$. When it is confirmed that the laser beam has arrived at the Y-coordinate $fy2_m$, the control proceeds to step 1108, in which the power of the laser beam is decreased by controlling the laser beam generator driver circuit 88 so that none of the materials of the multi-layered wiring structure MWS are removed. Note, at step 1108, the energization of the laser light source 66 may be stopped, if necessary.

At step 1109, the count number of the counter m is incremented by "1". Then, at step 1110, it is determined whether the count number of the counter m is smaller than "23". If m<23, the control proceeds to step 1111, in which it is monitored whether the laser beam has arrived at the Y-coordinate $fy2_m$. When it is confirmed that the laser beam has arrived at the Y-coordinate $fy2_m$, the control proceeds to step 1112, in which the movement of the laser beam is stopped.

At step 1113, the laser beam is moved with respect to the silicon wafer SW along the X-axis of the X-Y-Z coordinate system in a direction indicated by reference X1 in FIG. 4, i.e., in reality, the stepping motor 22 is driven so that the silicon wafer SW is moved along the X-axis of the X-Y-Z coordinate system in a direction indicated by reference X2 in FIG. 4.

At step 1114, it is monitored whether the laser beam has arrived the X-Y coordinate $FE2_m(fx2_m; fy2_m)$. When it is confirmed that the laser beam has arrived at X-Y coordinate $FE2_m(fx2_m; fy2_m)$, the control proceeds to step 1115, in which the movement of the laser beam is stopped. Then, at step 1116, the power of the laser beam is increased, and, at step 1117, to the laser beam is moved with respect to the silicon wafer SW along the Y-axis of the X-Y-Z coordinate system in the direction indicated by reference Y2 in FIG. 4, i.e., in reality, the stepping motor 32 is driven so that the silicon wafer SW is moved along the Y-axis of the X-Y-Z coordinate system in the direction Y1 (FIG. 4).

At step 1118, it is monitored whether the laser beam has arrived at the Y-coordinate $fy1_m$. When it is confirmed that the laser beam has arrived at the Y-coordinate $fy1_m$, the control proceeds to step 1119, in which the power of the laser beam is decreased by controlling the laser beam generator driver circuit 88, so that none of the materials of the multi-layered wiring structure MWS are removed.

At step 1120, the count number of the counter m is incremented by "1". Then, at step 1121, it is monitored whether the laser beam has arrived at the Y-coordinate $fy1_m$. When it is confirmed that the laser beam has arrived at the Y-coordinate $fy1_m$, the control proceeds to step 1122, in which the movement of the laser beam is stopped.

At step 1123, the laser beam is moved with respect to the silicon wafer SW along the X-axis of the X-Y-Z coordinate system in the direction X1 (FIG. 4), i.e., in reality, the stepping motor 22 is driven so that the silicon wafer SW is moved along the X-axis of the X-Y-Z coordinate system in the direction X2.

At step 1124, it is monitored whether the laser beam has arrived the X-Y coordinate $FE1_m(fx1_m; fy1_m)$. When it is confirmed that the laser beam has arrived at the X-Y coordinate $FE1_m(fx1_m; fy1_m)$, the control proceeds to step 1125, in which the movement of the laser beam is stopped. Then, at step 1126, the power of the laser beam is increased, and the control returns to step 1104.

At step 1105, when the count number of the counter m has reached "5", the control proceeds to step 1127, in which it is monitored whether the laser beam has arrived at the Y-coordinate $fy1_{(-FL1)}$ (FIG. 8). When it is confirmed that the laser beam has arrived at the Y-coordinate $fy1_{(-FL1)}$, the control proceeds to step 1128, in which the power of the laser beam is decreased by controlling the laser beam generator driver circuit 88, so that the alignment mark AM positioned at the location L1 cannot be removed.

At step 1129, it is monitored whether the laser beam has arrived at the Y-coordinate $fy1_{(+FL1)}$ (FIG. 8). When it is confirmed that the laser beam has arrived at the Y-coordinate $fy1_{(+FL1)}$, the control proceeds to step 1130, in which the power of the laser beam is increased. Then, the control returns to step 1107.

At step 1106, when the count number of the counter m has reached "19", the control proceeds to step 1131, in which it is monitored whether the laser beam has arrived at the Y-coordinate $fy1_{(-FL2)}$. When it is confirmed that the laser beam has arrived at the Y-coordinate $fy1_{(-FL2)}$, the control proceeds to step 1132, in which the power of the laser beam is decreased by controlling the laser beam generator driver circuit 88, so that the alignment mark AM positioned at the location L2 cannot be removed.

At step 1133, it is monitored whether the laser beam has arrived at the Y-coordinate $fy1_{(+FL2)}$ When it is confirmed that the laser beam has arrived at the Y-coordinate $fy1_{(+FL2)}$, the control proceeds to step 1134, in which the power of the laser beam is increased. Then, the control returns to step 1107.

At step 1110, when the count number of the counter m has reached "23", the control returns to step 1005 of the laser beam processing routine of FIG. 10.

Figure 12B:
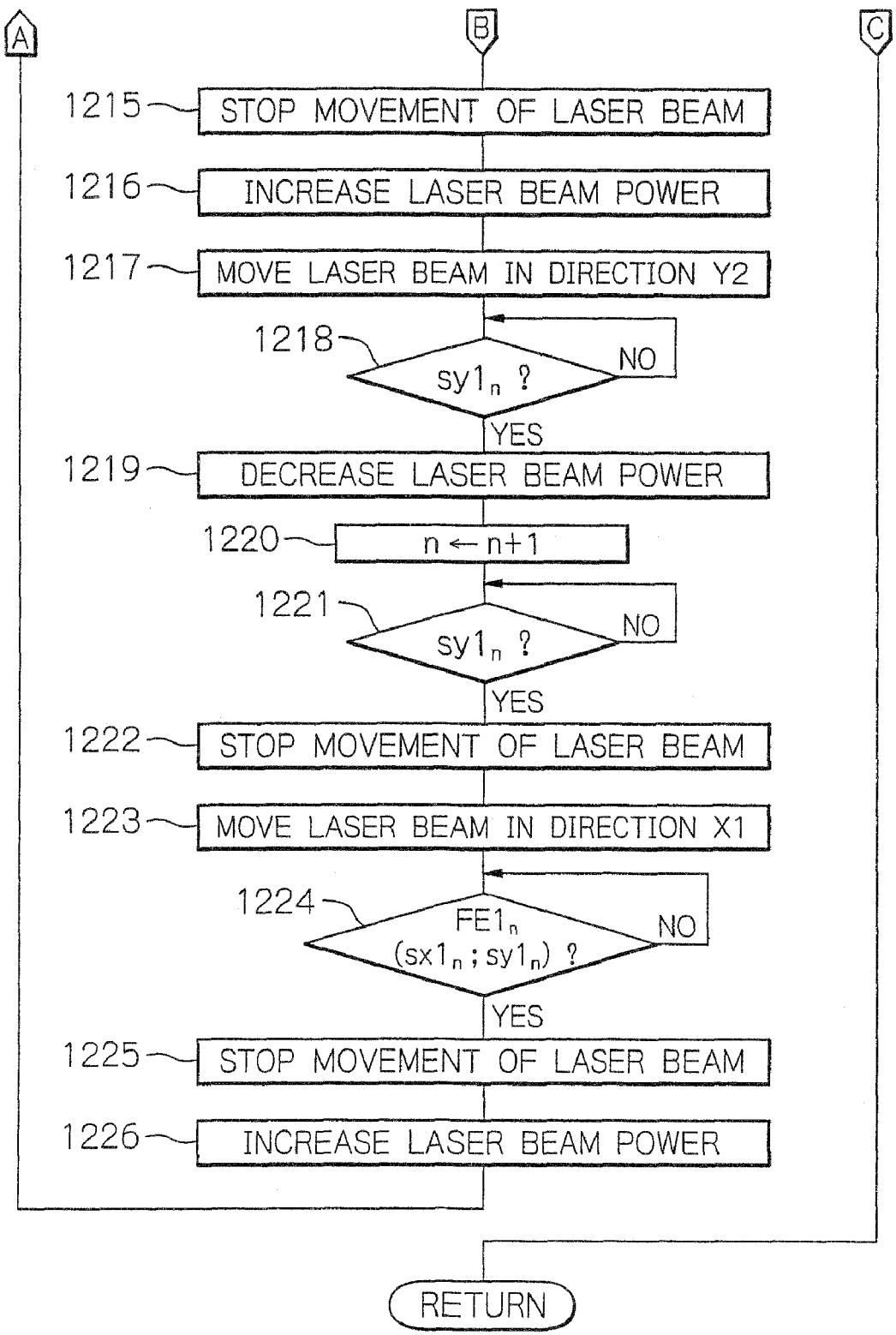
FIG. 12B is the remaining part of the flowchart of the second laser beam irradiation routine.

FIGS. 12A and 12B show a flowchart of the second laser beam irradiation routine which is executed as a subroutine in step 1009 of FIG. 10. Similar to the first laser beam irradiation routine of FIGS. 11A and 11B, in reality, although the silicon wafer SW is moved with respect to the laser beam irradiation head 64 to irradiate the scribe lines $SSL_n$ with the laser beam, it is presumed that the laser beam irradiation head 64, and therefore, the laser beam, is moved with respect to the silicon wafer SW for the sake of explanatory convenience.

At step 1201, a counter n is initialized to be "1" Then, at step 1202, the X-Y coordinate data $SE1_n(sx1_n; sy1_n)$ and $SE2_n(sx2_n; sy2_n)$, the coordinate data $SAL1_{(-SL1)}(sx1_{19}; sy1_{(-SL1)})$ and $SAL1_{(+SL1)}(sx1_{19}; sy1_{(+SL1)})$ and the coordinate data $SAL2_{(-SL2)}(sx1_3; sy1_{(-SL2)})$ and $SAL2_{(+SL2)}(sx1_3; sy1_{(+SL2)})$ are read from the hard disk 100, and are then stored in the random-access memory (RAM) contained in the system control unit 76.

At step 1203, the laser light source 66 of the laser beam generator 60 is energized by the laser beam generator driver circuit 88 under control of the system control unit 76, so that the laser beam is emitted from the laser beam irradiation head 64, whereby the location on the silicon wafer SW, represented by the X-Y coordinates $SE1_1(sx1_1; sy1_1)$, is irradiated with the emitted laser beam. Of course, the laser beam has a sufficient power to remove the materials of the multi-layered wiring structure MWS.

At step 1204, the laser beam irradiation head 66, and therefore, the laser beam, is moved with respect to the silicon wafer SW along the Y-axis of the X-Y-Z coordinate system in the direction Y1 (FIG. 4), i.e., in reality, the stepping motor 32 is driven so that the silicon wafer SW is moved along the Y-axis of the X-Y-Z coordinate system in the direction Y2.

At step 1205, it is determined whether a count number of the counter n has reached "3". When the count number of the counter n has not reached "3", the control proceeds from step 1205 to step 1206, in which it is determined whether the count number of the counter n has reached "19". When the count number of the counter n has not reached "19", the control proceeds from step 1206 to step 1207, in which it is monitored whether the laser beam has arrived at the Y-coordinate $sy2_n$. When it is confirmed that the laser beam has arrived at the Y-coordinate $sy2_n$, the control proceeds to step 1208, in which the power of the laser beam is decreased by controlling the laser beam generator driver circuit 88 so that none of the materials of the multi-layered wiring structure MWS are removed. Note, at step 1108, the energization of the laser light source 66 may be stopped, if necessary.

At step 1209, the count number of the counter n is incremented by "1". Then, at step 1210, it is determined whether the count number of the counter n is smaller than "22". If m<22, the control proceeds to step 1211, in which it is monitored whether the laser beam has arrived at the Y-coordinate $sy2_n$. When it is confirmed that the laser beam has arrived at the Y-coordinate $sy2_n$, the control proceeds to step 1212, in which the movement of the laser beam is stopped.

At step 1213, the laser beam is moved with respect to the silicon wafer SW along the X-axis of the X-Y-Z coordinate system in the direction X1 (FIG. 9), i.e., in reality, the stepping motor 22 is driven so that the silicon wafer SW is moved along the X-axis of the X-Y-Z coordinate system in the direction X2.

At step 1214, it is monitored whether the laser beam has arrived the X-Y coordinate $SE2_n(sx2_n; sy2_n)$. When it is confirmed that the laser beam has arrived at X-Y coordinate $SE2_n(sx2_n; sy2_n)$, the control proceeds to step 1215, in which the movement of the laser beam is stopped. Then, at step 1216, the power of the laser beam is increased, and, at step 1217, the laser beam is moved with respect to the silicon wafer SW along the Y-axis of the X-Y-Z coordinate system in the direction Y2 (FIG. 9), i.e., in reality, the stepping motor 32 is driven so that the silicon wafer SW is moved along the Y-axis of the X-Y-Z coordinate system in the direction Y1.

At step 1218, it is monitored whether the laser beam has arrived at the Y-coordinate $sy1_n$. When it is confirmed that the laser beam has arrived at the Y-coordinate $sy1_n$, the control proceeds to step 1219, in which the power of the laser beam is decreased by controlling the laser beam generator driver circuit 88, so that none of the materials of the multi-layered wiring structure MWS are removed.

At step 1220, the count number of the counter n is incremented by "1". Then, at step 1221, it is monitored whether the laser beam has arrived at the Y-coordinate $sy1_n$. When it is confirmed that the laser beam has arrived at the Y-coordinate $sy1_n$, the control proceeds to step 1222, in which the movement of the laser beam is stopped.

At step 1223, the laser beam is moved with respect to the silicon wafer SW along the X-axis of the X-Y-Z coordinate system in the direction X1 (FIG. 9), i.e., in reality, the stepping motor 22 is driven so that the silicon wafer SW is moved along the X-axis of the X-Y-Z coordinate system in the direction indicated by reference X2.

At step 1224, it is monitored whether the laser beam has arrived the X-Y coordinate $SE1_n(sx1_n; sy1_m)$. When it is confirmed that the laser beam has arrived at the X-Y coordinate $SE1_n(sx1_n; sy1_n)$, the control proceeds to step 1225, in which the movement of the laser beam is stopped. Then, at step 1226, the power of the laser beam is increased, and the control returns to step 1204.

At step 1205, when the count number of the counter n has reached "3", the control proceeds to step 1227, in which it is monitored whether the laser beam has arrived at the Y-coordinate $sy1_{(-SL2)}$. When it is confirmed that the laser beam has arrived at the Y-coordinate $sy1_{(-SL2)}$, the control proceeds to step 1228, in which the power of the laser beam is decreased by controlling the laser beam generator driver circuit 88, so that the alignment mark AM positioned at the location L2 cannot be removed.

At step 1229, it is monitored whether the laser beam has arrived at the Y-coordinate $sy1_{(+SL2)}$. When it is confirmed that the laser beam has arrived at the Y-coordinate $sy1_{(+SL2)}$, the control proceeds to step 1230, in which the power of the laser beam is increased. Then, the control returns to step 1207.

At step 1206, when the count number of the counter n has reached "19", the control proceeds to step 1231, in which it is monitored whether the laser beam has arrived at the Y-coordinate $sy1_{(-SL1)}$. When it is confirmed that the laser beam has arrived at the Y-coordinate $sy1_{(-SL1)}$, the control proceeds to step 1232, in which the power of the laser beam is decreased by controlling the laser beam generator driver circuit 88, so that the alignment mark AM positioned at the location L1 cannot be removed.

At step 1233, it is monitored whether the laser beam has arrived at the Y-coordinate $sy1_{(+SL1)}$. When it is confirmed that the laser beam has arrived at the Y-coordinate $sy1_{(+SL1)}$, the control proceeds to step 1234, in which the power of the laser beam is increased. Then, the control returns to step 1207.

At step 1210, when the count number of the counter n has reached "22", the control returns to step 1009 of the laser beam processing routine of FIG. 10.

Figure 13:
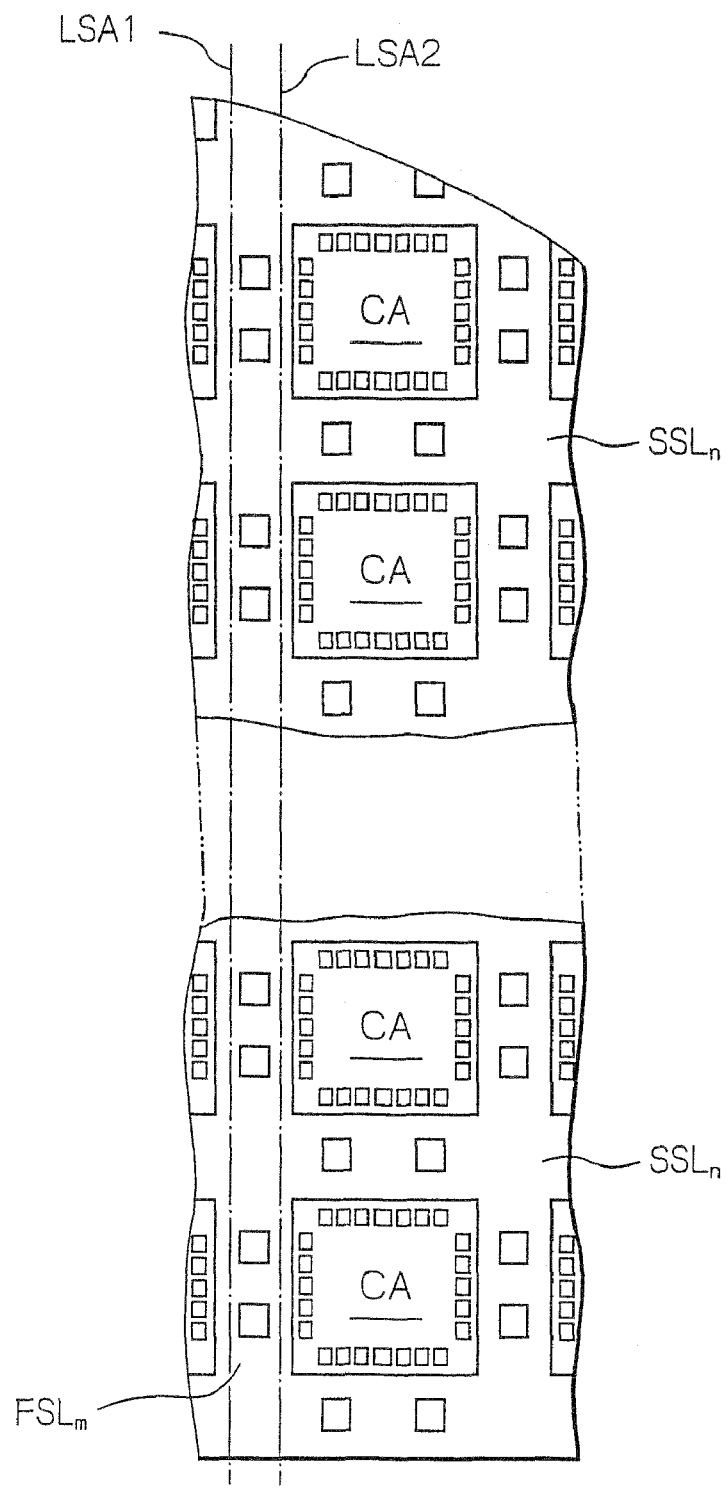
FIG. 13 is a partial plan view of a silicon wafer features scribe lines having a width of 70 μm, for explaining application of the present invention to such a silicon wafer.

With reference to FIG. 13, a part of a silicon wafer SW is illustrated in a plan view. This silicon wafer SW features scribe lines $FSL_m$ and $SSL_n$ having a width of 70 μm. In this case, it is not easy to effectively remove the multi-layered wiring structure from the silicon wafer SW along scribe lines $FSL_m$ and $SSL_n$ by irradiating it with a laser beam, because a spot diameter of the laser beam is usually within a range from 10 μm to 20 μm.

Figure 14:
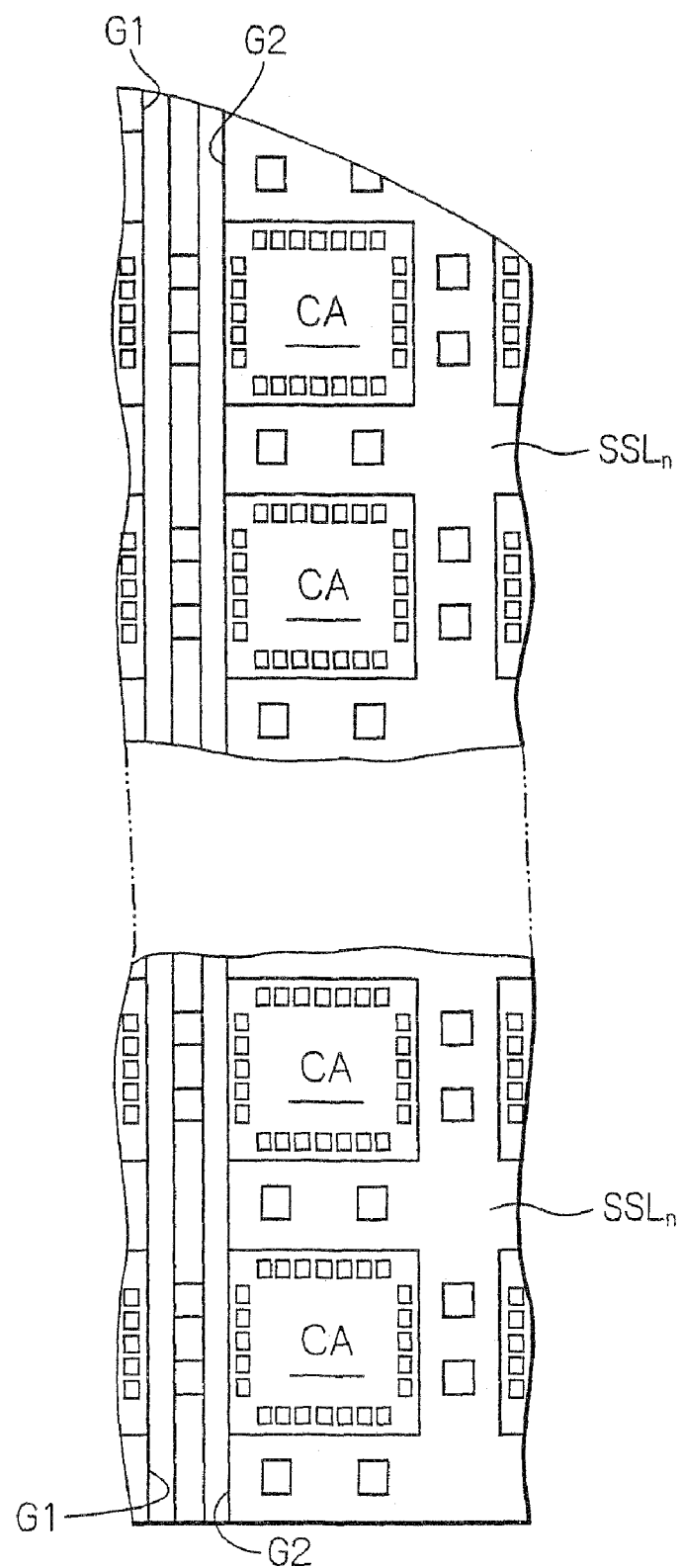
FIG. 14 is a partial plan view, similar to FIG. 13, showing the silicon wafer featuring a set of longitudinal grooves G1 and G2 formed in a multi-layered wiring structure along a scribe line.

According to the present invention, the scribe lines $FSL_m$ and $SSL_n$, are defined along the sides of each of the scribe lines $FSL_m$ and $SSL_n$, and each of the scribe lines $FSL_m$ and $SSL_n$ is irradiated with the laser beam along the longitudinal side axes LSA1 and LSA2, using the laser beam processing apparatus as shown in FIG. 1, so that a set of longitudinal grooves G1 and G2 are formed in the multi-layered wiring structure, as shown in FIG. 14. Namely, a material of the multi-layered wiring structure is left on each of the scribe lines $FSL_m$ and $SSL_n$ along a longitudinal center thereof.

During a dicing process of this silicon wafer SW, although chips or cracks may occur in the material of the multi-layered wiring structure left on each of the scribe lines $FSL_m$ and $SSL_n$, the chips or cracks cannot penetrate into the wiring arrangement sections allocated to the respective semiconductor chip areas CA, due to the existence of the grooves G1 and G2.

By suitably defining a set of X-Y coordinates at the ends of each of the scribe lines $FSL_m$ and $SSL_n$, on each of the longitudinal side axes LSA1 and LSA2, it is possible to automatically carry out the irradiation of the scribe lines $FSL_m$ and $SSL_n$ with the laser beam, using the laser beam processing apparatus according to the present invention. Of course, the irradiation of the scribe lines $FSL_m$ and $SSL_n$ with the laser is performed such that an alignment mark is left on one of the scribe lines $FSL_m$ and $SSL_n$, in substantially the same manner as mentioned above.

In the aforesaid embodiment, when the irradiation of a scribe line ($FSL_m$, $SSL_n$) with the laser beam is completed, or when the alignment mark areas AMA is defined, the power of the laser beam is decreased by controlling the laser beam generator driver circuit 88. Namely, the power of the laser beam is frequently varied, and thus the power of the laser beam is liable to be unstable. For this reason, for example, it is preferable to incorporate an acoustic optical modulator in the laser beam generator 60.

Figure 15:
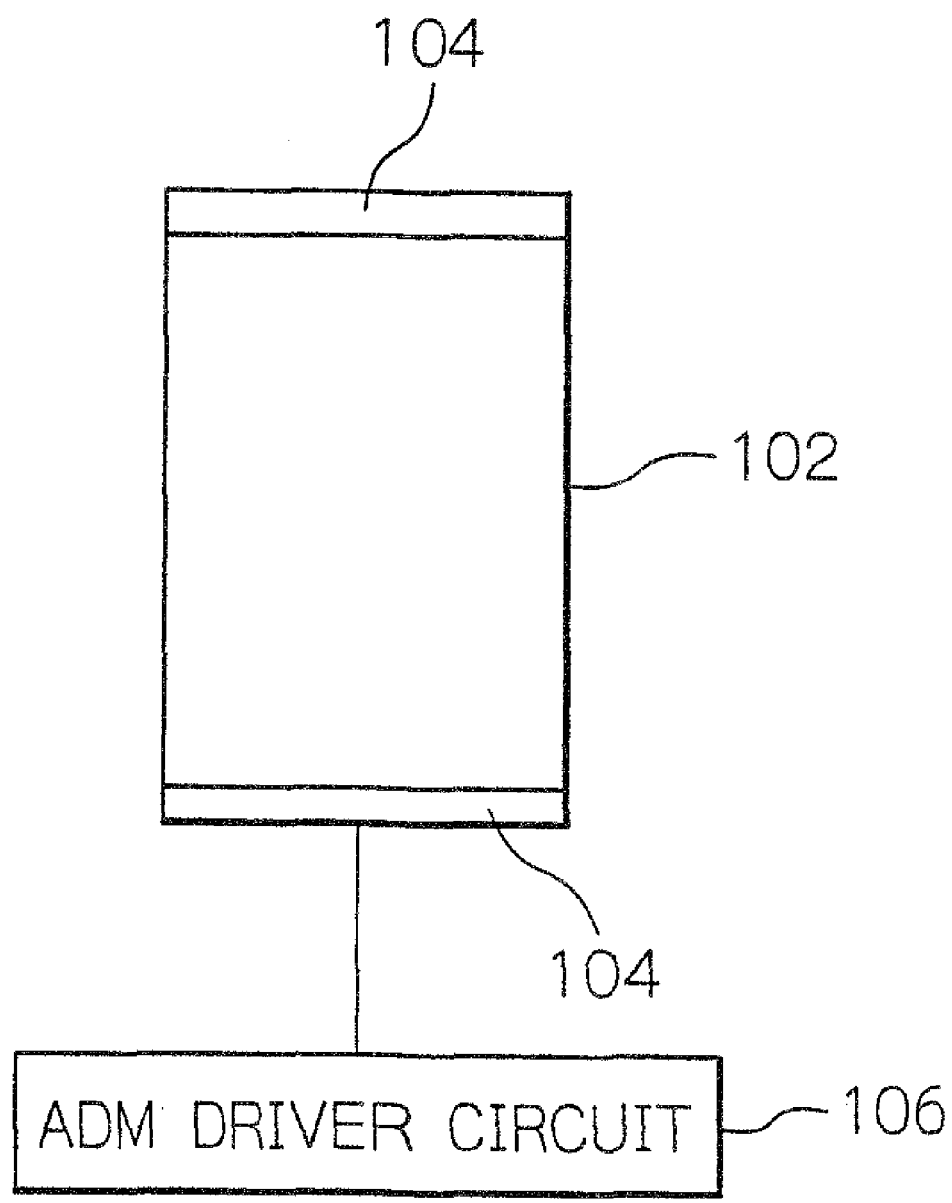
FIG. 15 is a schematic view of an acoustic optical modulator which may be incorporated in a laser beam generator shown in FIG. 2.

As shown in FIG. 15, the acoustic optical modulator includes a transparent dielectric 102 sandwiched between a pair of electrodes 104, and is driven by an AOM driver circuit 106 which is operated under control of the system control circuit 76 (FIG. 3). The acoustic optical modulator is inserted into an optical path through which the laser beam passes. While the acoustic optical modulator is not driven, the laser beam merely passes through the transparent dielectric 102. When the acoustic optical modulator is driven, the laser beam is subjected to diffraction so as to be deflected from the optical path.

In short, by incorporating the acoustic optical modulator in the laser beam generator 60, it is possible to maintain the power of laser beam constant.

Of course, when the acoustic optical modulator is used, it is driven in steps 1108, 1119, 1128 and 1132 of the first laser beam irradiation routine of FIGS. 11A and 11B and steps 1208, 1219, 1228 and 1232 of the second laser beam irradiation routine of FIGS. 12A and 12B, and the drive of the acoustic optical modulator is stopped in steps 1116, 1126, 1130 and 1134 of the first laser beam irradiation routine of FIGS. 11A and 11B and steps 1216, 1226, 1230 and 1234 of the second laser beam irradiation routine of FIGS. 12A and 12B. Note, a galvano-mirror may be substituted for the acoustic optical modulator.

Optionally, the optical focusing system 70 (FIG. 2) may include a movable lens which is mechanically moved between a focus position and a defocus position by a suitable actuator. In particular, the movable lens is usually placed at the focus position so that the laser beam is focused on the silicon wafer. When the movable lens is moved from the focus position to the defocus position, the laser beam is defocused so that the material of the multi-layered wiring structure cannot be removed.

Figure 16:
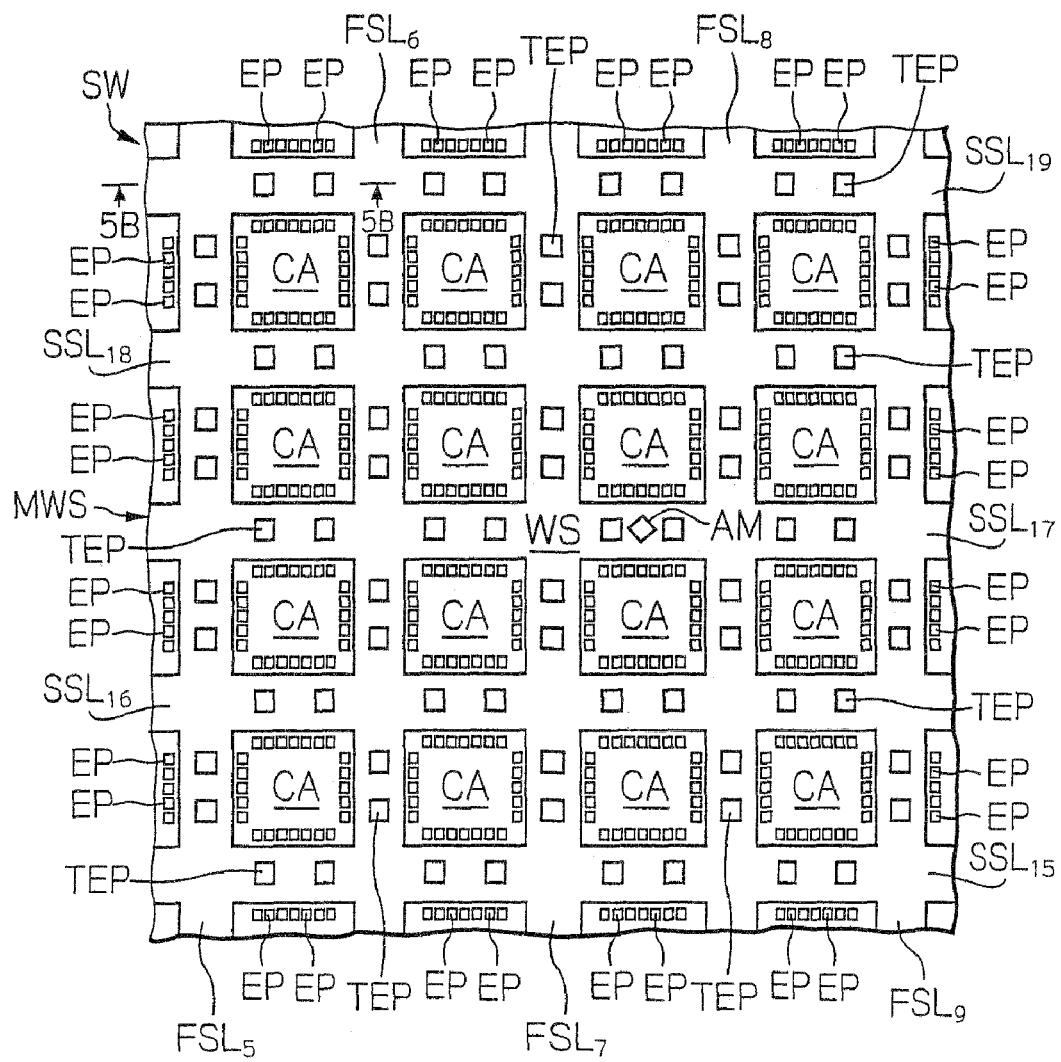
FIG. 16 is a partially-enlarged plan view, similar to FIG. 5A, showing a silicon wafer featuring an alignment mark which is out of a cross point of scribe lines.

In the above-mentioned embodiment, although each of the alignment marks AM is placed at the cross point of the scribe lines, it may be positioned at another location. For example, as shown in FIG. 16, an alignment mark AM may be placed on the scribe line $SSL_{17}$ at a location between two adjacent semiconductor chip areas CA. When the alignment marks AM is placed at the cross point of the scribe lines, the power of the laser beam must be controlled twice to define the alignment mark AMA. On the other hand, as shown in FIG. 16, when the alignment mark AM is out of the cross point, it is possible to obtain the alignment mark area AMA by only once controlling the power of the laser beam.

In the above-mentioned embodiment, although the two alignment marks AM are used, it is possible to form more than two alignment marks on the silicon wafer to improve the positioning precision. Also, when the orientation flat OF of the silicon wafer AW is utilized for positioning, only one alignment mark may be formed on the silicon wafer.

Finally, it will be understood by those skilled in the art that the foregoing description is of preferred embodiments of the methods and devices, and that various changes and modifications may be made to the present invention without departing from the spirit and scope thereof.

The invention claimed is:

1. A laser beam processing method comprising:
preparing a semiconductor wafer having a multi-layered wiring structure formed thereon, a scribe line defined thereon, and at least one alignment mark formed on said scribe line;
generating a laser beam;
relatively moving said semiconductor wafer with respect to said laser beam such that said semiconductor wafer is irradiated with a laser beam along said scribe line to partially remove said multi-layered wiring structure from said semiconductor wafer along said scribe line; and
controlling the irradiation of the semiconductor wafer with the laser beam along said scribe line such that said alignment mark is left on said scribe line.

2. The laser beam processing method as set forth in claim 1, wherein, in controlling the irradiation of the semiconductor wafer with the laser beam along said scribe line such that said alignment mark is left on said scribe line, a power of the laser beam is decreased when said alignment mark is irradiated with said laser beam, whereby it is ensured that said alignment mark is left on said scribe line.

3. The laser beam processing method as set forth in claim 1, wherein, in controlling the irradiation of the semiconductor wafer with the laser beam along said scribe line such that said alignment mark is left on said scribe line, the laser beam is deflected when said alignment mark is irradiated with said laser beam, whereby it is ensured that said alignment mark is left on said scribe line.

* * * * *